United States Patent

Clark, Jr. et al.

[15] 3,697,703
[45] Oct. 10, 1972

[54] SIGNAL PROCESSING UTILIZING BASIC FUNCTIONS

[72] Inventors: Melville Clark, Jr., Cochituate; David A. Luce, Natick, both of Mass.

[73] Assignee: Melville Clark Associates, Cochituate, Mass.

[22] Filed: Aug. 15, 1969

[21] Appl. No.: 857,271

Related U.S. Application Data

[63] Continuation-in-part of Ser. No. 733,470, May 31, 1968.

[52] U.S. Cl. ................................................179/1 SA
[51] Int. Cl. ................................................G101 1/00
[58] Field of Search ............179/1 SA, 15.55; 324/77; 340/172.5

[56] References Cited

UNITED STATES PATENTS

| | | |
|---|---|---|
| 3,421,147 | 1/1969 | Burton ....................340/172.5 |
| 3,319,002 | 5/1967 | De Clerk ..................179/1 SA |
| 3,483,512 | 12/1969 | Atkins ....................179/1 SA |
| 3,102,165 | 8/1963 | Clapper ...................179/1 SA |
| 3,129,287 | 4/1964 | Bakis .....................179/1 SA |
| 3,236,947 | 2/1966 | Clapper ...................179/1 SA |
| 3,403,227 | 9/1968 | Malm ......................179/1 SA |

*Primary Examiner*—Kathleen H. Claffy
*Assistant Examiner*—Jon Bradford Leaheey
*Attorney*—Charles Hieken

[57] ABSTRACT

The present invention relates to the analysis and synthesis of complex time-varying signals over a wide range of frequencies and amplitudes in terms of selectable sets of expansion functions.

Analysis consists of gating a time-sampled representation of the input signal stored on capacitors, into resistor matrices, which compute other desired representations. Use of the Fourier series representation in the analysis produces Fourier phazor components, which are converted to resultant vector amplitudes and phases by carrier generation through modulation by the phazors of 90°-out-of-phase, very high frequency, reference oscillators. Synchronous carrier demodulation gives resultant Fourier amplitudes. Carrier phase, relative to one of the reference oscillators, being equal to the Fourier phase, is determined by time (between zero crossings)-to-voltage conversion. Analyzer tuning may be external, voltage-controlled, or phase-controlled. When tuning is phase controlled, phase computing circuits lock the analyzer frequency to that of the input signal. The analysis bandwidth may be absolute- or voltage-controlled fractional, the latter being achieved by a variable-duty-cycle time-sampling-filter method. Frequency-tracking-system control of the voltage for controlled fractional bandwidth gives the ability to analyze with narrow bandwidth while providing wide band frequency tracking. A slowly varying phase-time derivative, when present for an appropriate length of time, is used to test for input signal coherence. The test result is used to control frequency tracking to prevent erratic tuning during attempted frequency tracking of incoherent signals.

Relative phase values over a range greater than the normal range of $2\pi$ radians are made possible by sensing the traversals of the phase cut.

For synthesis, control signals are generated and applied to a transformation matrix which, via multiplexing of the matrix outputs gives the sequential representation of a signal. Curves used to derive control signals, on film are read at high speed using a flying spot scanner. Spot intensity differentiation with zero crossing detection gives extremely high accuracy independent of spot intensity. Fourier log or linear amplitude and phase curve values are serially converted to phazor components synchronously with scanning by gated excitation and gated dissipation of high Q LC resonant circuits. Appropriate final stage gating and filtering of the time-sample representation eliminates system transients and objectionable frequency components due to the quantization of the output signal.

53 Claims, 15 Drawing Figures

INVENTORS
MELVILLE CLARK, JR.
DAVID A. LUCE
BY
Wolf, Greenfield & Hieken

INVENTORS
MELVILLE CLARK, JR.
DAVID A. LUCE
BY Wolf, Greenfield & Hieken

INVENTOR
MELVILLE CLARK, JR.
DAVID A. LUCE
BY
Wolf, Greenfield & Hieken

PATENTED OCT 10 1972

3,697,703

SHEET 04 OF 14

INVENTORS
MELVILLE CLARK, JR.
DAVID A LUCE
BY Wolf, Greenfield & Hieken

INVENTORS
MELVILLE CLARK, JR.
DAVID A. LUCE
BY *Wolf, Greenfield & Hieken*

INVENTORS
MELVILLE CLARK, JR.
DAVID A. LUCE
BY
Wolf, Greenfield + Hieken

PATENTED OCT 10 1972 3,697,703

SHEET 07 OF 14

INVENTOR.
MELVILLE CLARK, JR.
DAVID A. LUCE
BY Wolf, Greenfield & Hieken

INVENTORS
MELVILLE CLARK, JR.
DAVID A. LUCE
BY Wolf, Greenfield & Hieken

INVENTOR.

BY Charles Hieken, Attorney

INVENTORS
MELVILLE CLARK, JR.
DAVID A. LUCE
BY
Wolf, Greenfield & Hieken

INVENTORS
MELVILLE CLARK, JR.
DAVID A. LUCE
BY Wolf, Greenfield & Hieken

INVENTORS
MELVILLE CLARK, JR.
DAVID A. LUCE
BY
Wolf, Greenfield & Hieken

INVENTORS
MELVILLE CLARK, JR.
DAVID A. LUCE
BY Wolf, Greenfield & Hieken

INVENTOR
MELVILLE CLARK, JR.
DAVID A. LUCE
BY *Wolf, Greenfield & Hieken*

SIGNAL PROCESSING UTILIZING BASIC FUNCTIONS

This is a continuation-in-part of application Ser. No. 733,470 filed May 31, 1968 entitled signal Processing by Melville Clark, Jr. and David A. Luce.

BACKGROUND

The present invention relates in general to the analysis and synthesis of complex signals whose pseudoperiodic waveforms change with time. It is a specific feature of this invention that different representations of a signal may be exploited, so that in any given application the simplest one for a given signal may be used.

The signals of musical instruments, speech, seismic waves, and the like are extremely complex. The frequencies and amplitudes of these complex signals change in times comparable to the periods of the components in the signals themselves. Thus, it is useful for the analyzer-synthesizer to be capable of providing a representation up to the limits of the uncertainity principle. According to this principle, the error with which the frequency of a signal may be defined is in the order of the reciprocal of the temporal duration during which the signal is inspected and considered of fixed frequency. Thus, a very precise frequency can be associated with a sine wave lasting over many cycles; the frequency of a short section of one cycle is very uncertain, indeed.

For the construction of new musical instruments, in the analysis of the effects of electrical circuits upon signals, in the development of devices to produce speech, in the design of instruments to recognize speech, musical instruments, and other patterns of information, it is highly desirable to represent broad classes of signals as a superposition of a set of functions, called basis functions. The basis functions may be periodic in time, have certain analytical properties that make them especially useful, or obey other laws, such as orthogonality, that enhance their utility. Typical examples of basis functions are the trigonometric functions, a set of pulses spanning an interval of time and orthogonal to each other, Bessel functions, Legendre polynomials, Laguerre polynomials, hypergeometric functions, confluent hypergeometric functions, and the like.

An arbitrary function $f(t)$ of time $t$ to be analyzed or synthesized may be represented as a superposition of the basis functions, $\phi_n(t)$, with coefficients $c_n$ (modulation functions) appropriate to the arbitrary function $f(t)$ being represented. The set of coefficients are, of course, specific to the signal being represented and to the set of basis functions chosen. Thus, $$f(t)=\sum_{n=1}^{\infty} c_n\phi_n(t). \qquad (1)$$

If, as is often the case, the functions $\phi_n$ are orthogonal to each other over some time interval T $$\int_T dt'\phi_n(t')\phi_m(t')=\begin{cases}1, & \text{if } n=m,\\ 0, & \text{if } n\neq m,\end{cases} \qquad (2)$$

then $$c_n=\int_T dt'\phi_n(t')f(t'). \qquad (3)$$

Now, it is obvious that in practice it is not possible to extend the summation over an infinite set of basis functions. In practice, the series is truncated after a finite set of terms. The representation will be said to be the better for our present purposes, the fewer the number N of terms required to represent the arbitrary signal to a given accuracy. Thus, the representation that is best to use will be dependent upon the properties of the arbitrary signals belonging to the class of arbitrary functions that it is desired to represent.

The expansion of the function $f(t)$ according to the equations 1, 2, and 3 is valid for all time only if $f(t)$ is exactly repetitive in time with a period T. While static waveform analysis or synthesis may be performed then with the modulation functions $c_n$ as the variables of the representation of the signal, the types of signals of interest here are those that are pseudo-periodic. By pseudo-periodic we mean waveforms that are almost periodic in time, the relative change in the waveform per approximate period being small. If the signal to be analyzed or synthesized is expanded in terms of the modulation functions and if the waveform is almost periodic with a period T, then we would expect the modulation functions $c_n$ to change only slightly as we perform repeated analyses according to equation 3 where the origin of the integration process is advanced in time. In this case, the $c_n$ become functions of time defined by $$c_n(t)=\int_{t-T}^{t} dt'\phi_n(t')f(t'). \qquad (4)$$

If the fractional change in $c_n(t)$ is small during any interval of time T, which may be expressed by $$T[d(\ln c_n(t))/dt] << 1, \qquad (5)$$

then the signal $f(t)$ being analyzed may be expressed approximately by $$f(t)\approx\sum_{n=1}^{N} c_n(t)\phi(t), \qquad (6)$$

where the series of terms used in the representation is truncated at $N$ for practical computational purposes.

A particularly useful expansion of the signal $f(t)$ is the Fourier expansion, the one used in the present analysis and synthesis system constructed. The expansion for the Fourier representation is $$f(t)\approx\sum_{n=1}^{N}[a_n(t)\cos(n\omega_o t)+b_n(t)\sin(n\omega_o t)],\ \omega_o=2\pi/T, =2\pi f_o. \qquad (7)$$

The quantity $f_o$ is the fundamental frequency of the expansion and represents the frequency of waveform repetition. The $a_n$ and the $b_n$ are called the Fourier phazor components of the $n$th frequency component. Equation (7) may be recast in the form $$f(t) \approx \sum_{n=1}^{N} c_n(t) \sin [n\omega_o t + \phi_n(t)], \quad (8)$$

where $$c_n(t) = \sqrt{a_n^2(t) + b_n^2(t)}, \phi_n(t) = \tan^{-1}(b_n(t)/a_n(t)). \quad (9)$$

The $c_n(t)$ and the $\phi_n(t)$ are called the Fourier amplitude and phase, respectively, of the $n$th frequency component. The explicit expressions for the phazor components $a_n$ and $b_n$ are given by $$b_n(t) = \int_{t-T}^{t} dt' \sin (n\omega_o t') f(t'), \quad (10)$$

$$a_n(t) = \int_{t-T}^{t} dt' \cos (n\omega_o t') f(t'). \quad (11)$$

Such a representation works very well for broad classes of signals. We have reason to believe that it will work satisfactorily for speech. The $c_n(t)$ are called modulation functions for obvious reasons. Accordingly, an analyzer-synthesizer has been invented that can process waveforms that change with time and provide a representation most suitable to the case of study.

Basically the invention uses an orthogonal, rectangular pulse representation $\psi_n(t)$ as its basic mode and transforms to other representations by means of a resistor matrix. Thus, in the analysis mode, the device finds the representation $d_n$ of an arbitrary signal $f(t)$ with respect to a basis $\psi_n(t)$ of orthogonal, rectangular pulses that completely span the period T of the analysis frequency.

$$f(t) = \sum_{n=1}^{\infty} d_n \psi_n(t). \quad (12)$$

Essentially, the analyzer computes $$d_n = \int_T dt' \psi_n(t') f(t'). \quad (13)$$

A resistor matrix then transforms the representation $d_n$ found to the representation $c_n$ desired. Our explanation is facilitated by the assumption of orthogonality and normality of the basis functions, although there is no such requirement in the practical implementation. In the case where the basis functions are orthonormal, from equations (1) and (12) it is easy to see that $$c_n = \sum_{m=1}^{\infty} d_m \int_T dt' \psi_m(t') \phi_n(t'). \quad (14)$$

The integrals (3), (13), and (14) are computed over the interval of time T during which they are orthogonal.

As mentioned above, the representation may be altered by a change of a printed circuit board containing resistors, as is especially convenient for the particular class of signals being represented. For many signals, sampling pulses and trigonometric functions are particularly convenient. Accordingly, in the analysis mode, the amplitude outputs from the transformation matrix are converted to a logarithmic scale (decibels). These and the phases, which have meaning chiefly only for trigonometric functions are plotted as a function of time on an oscilloscope that is photographed with roll film in an automatically sequencing camera or with Polaroid film. In the synthesis mode, the numerous curves are scanned at very high speed with high accuracy. The results are stored for use at the times selected by the logic. A signal is synthesized and reproduced through a loudspeaker and recorded on tape.

OBJECTS

Some of the objects of this invention are as follows:

1. The analysis and synthesis of complex, temporally dependent signals.
2. The analysis of complex, temporally dependent signals to the limit permitted by the uncertainity principle.
3. The enhancement of the frequency resolution of an analysis by reduction of the time resolution as required by the uncertainity principle. Thus, the bandwidth of the filters effectively simulated can be adjusted to suit the signal under study.
4. The analysis of a complex waveform whose frequency changes with time by tracking the frequency of the input signal and producing a signal proportional to this tracking frequency.
5. The analysis of signals over a very wide band of frequencies of the input signal with very great accuracy.
6. The analysis and synthesis of complex signals with temporally dependent, pseudoperiodic waveforms in real time.
7. The provision of arbitrary, user-selected basis functions to represent the signals being analyzed or synthesized belonging to a class of interest.
8. The transformation of the results of an analysis to a form independent of the particular point during the period of a basis function at which the analysis happens to start. Thus, amplitudes and relative phases are computed and displayed with trigonometric basis functions, rather than the coefficients of the cosines and sines themselves. For stationary signals, the former are independent of the particular point in time at which the analysis happens to begin, the latter are not.
9. The measurement and plotting of the time relations between different basis functions, i.e., the phase of one component relative to another in the case of trigonometric functions.
10. The achievement of a very wide dynamic range, i.e., high signal-to-noise ratio, as is needed for musical signals.
11. The synthesis of signals over a very wide range of frequencies.
12. The display of the output from the analysis mode in a suitable form. Thus, amplitudes are presented in a logarithmic scale so that the display will bear a closer resemblance to the requirements and response of the auditory process.
13. The capability of reading graphs of the components of an arbitrary signal as a function of time in real time when the instrument is in the synthesis mode.
14. The capability of reading the displays produced in the analysis mode in the synthesis mode.
15. The capability of distinguishing between coherent and incoherent information, so that a frequency may be automatically abstracted only from the former.

16. The capability of performing narrow frequency band analysis while retaining the capability of wide band frequency tracking of the input signal in the analysis mode.

17. The utilization of symmetry properties of the basis functions to reduce the complexity of circuitry used in the analysis.

18. The calculation of the instantaneous frequency of the signal in the analysis mode.

19. The provision of a period dividing circuit that can divide the period of a signal by an arbitrary integer over a wide range of frequencies.

20. The conversion of logarithmic amplitudes and phases to Fourier phazor coefficients.

21. The capability of reading traces with much higher resolution (by a factor of 10 or more) than the width of the reading probe itself.

22. The performance of all these functions at as low a cost as possible in a compact device operating in real time under operator control.

23. The provision of a communication system in which the communication link is of much narrower bandwidth than the signals applied to and produced by the system.

24. Provisions for very wideband frequency tracking via the computation of a phase signal whose range may be much larger than the normal range of $2\pi$ radians.

25. The synthesis of complex signals which are time quantized, which contain frequency components up to almost half the time sample rate, but contain no additional spurious or folded objectionable high frequency components due to the quantization, is accomplished by a frequency controlled post-filter.

Prior to the present invention an enormous, extremely expensive, high speed, digital computer with analog-to-digital and digital-to-analog convertors, high speed input-output terminals, and special buffering and logical equipment was used because there was no other instrument capable of performing the tasks required. Further, the computer speed was far too slow to permit operation in real time; adjustments of the analyses and syntheses was extremely time consuming and awkward despite most exceptionally good conditions for conducting the investigations.

DESCRIPTION OF DRAWINGS

Numerous other features, objects, and advantages of the invention will become apparent from the following specification when read in connection with the accompanying drawings in which.

Figure 1:
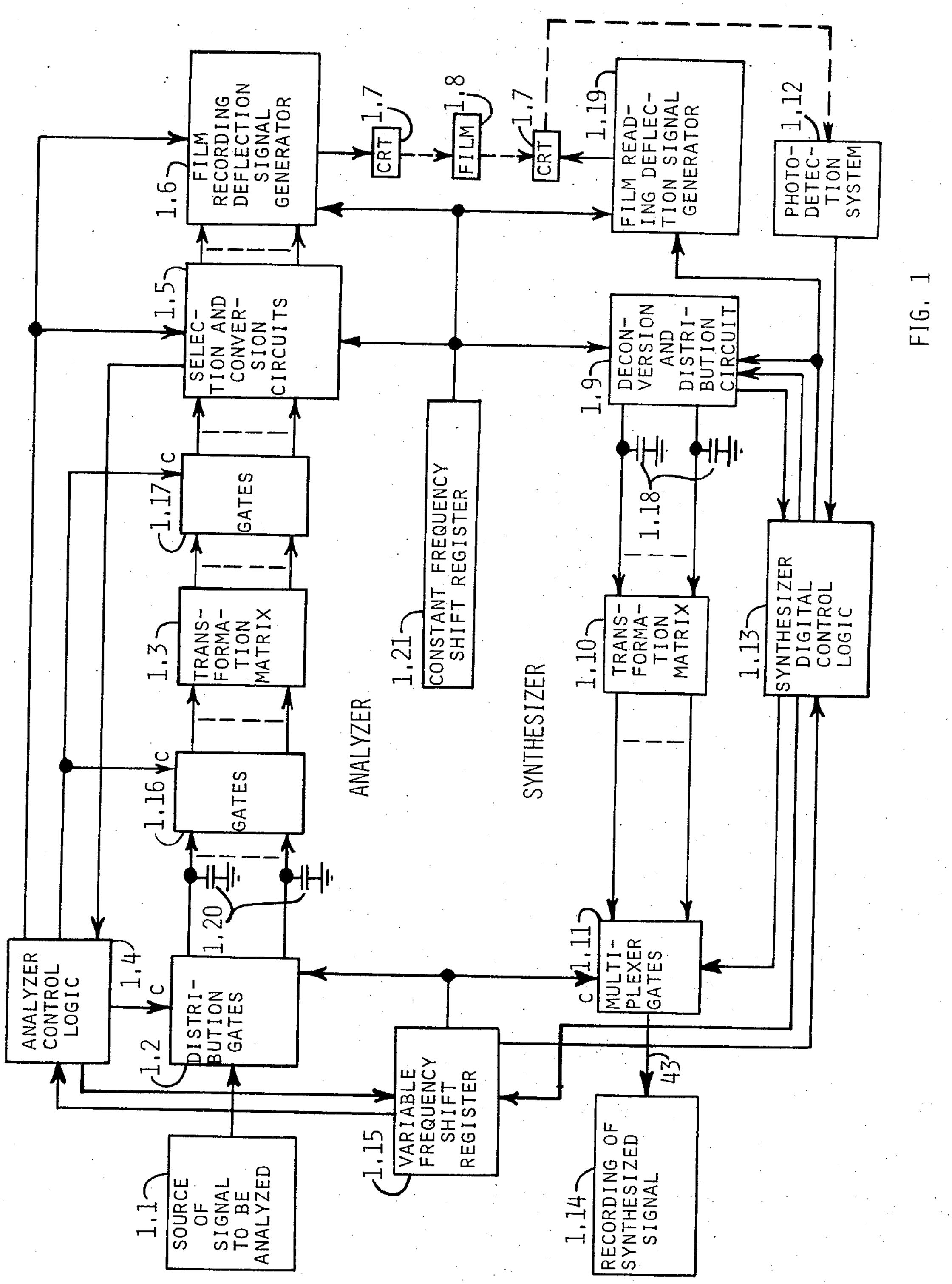
FIG. 1 is a block diagram of the entire analysis and synthesis system in a schematized fashion.

In the figures a number of customs have been followed: Those blocks for which schematic diagrams are not included are well known to those skilled in the art and frequently commercially available. The words "flip flop" and "bistable multivibrator" will be considered synonymous. The words "one-shot", "univibrator", and "monostable multivibrator" will be considered synonymous. On lines terminating in the flip flops, the lines labeled "R", "S", and "T" cause resetting, setting, or toggling (change of output state) of the respective flip flop line. The lines emanating from the flip flops labeled "R" and "S" are the reset and set outputs of the respective flip flop. The word "AND" has the same meaning as "AND gate." The word "gate" when not used in a digital logic function, is an analog gate comprised of an electronic switch that is either ON or OFF, depending upon the state of the control signal applied. In the figures, the control signal line is indicated by a "C." Such gates may consist of a transistor or a field-effect transistor. The switching signal is applied to the base (or gate for a field-effect transistor) and to either one of the other two terminals. The switched signal current flows through the collector and emitter (drain and source for a field-effect transistor). A shunt gate is merely an analog gate that may short some other element, such as a condenser, upon application of an appropriate switching signal. The abbreviation "CRT" stands for "cathode-ray tube" or "-cathode-ray oscilloscope," as the case required. The abbreviation "VCO" stands for "voltage-controlled oscillator". Storage capacitors are shown with an input and output terminal. The input and output terminals are connected in common to one terminal of the capacitor, and the other terminal of the capacitor is connected to ground.

To facilitate finding elements of circuits in various figures, each element of each circuit is designated by a decimal number, the number before the decimal point being the same as the number of the in which that element may be found and the number following the decimal point designating the specific element of the figure. Lines are also designated by numbers; all digits preceding the last one denote the figure from which the line originates, the last digit denoting the particular line of the figure. Each line connecting two different parts of a circuit is a single wire unless interrupted by a circle with a number inside it, except for FIG. 1. A line interrupted with a circle will always connect two blocks and the number inside the circle denotes the number of wires represented by each line. Again, many blocks consist or repeated elements of a common type. The number of elements repeated within a block is some-times indicated within the block and is disclosed in Table F.1. The number of time samples of the input signal taken during one ring cycle of the shift register 2.16 is denoted by 2N.

To reduce the enormous volume of figures and description that would otherwise result, both the figures and description omit details that are superfluous and obvious to those skilled in the art, including connections, circuit elements that are not novel, and the like. The figures and descriptions are then restricted largely to novel combinations, as disclosed in the block diagrams, and to novel circuit elements. Table F.1. Number of elements in each unit designated.

| Unit designation | Description of unit | Number of elements in unit | |
|---|---|---|---|
| 2.7 | Time sampling gates | 2N | |
| 2.8 | Time sampling gates | 2N | |
| 2.9 | Storage capacitors | 2N | |
| 2.10 | Storage capacitors | 2N | |
| 2.11 | Matrix input strobe gates | 2N | |
| 2.12 | Matrix input strobe gates | 2N | |
| 2.16 | Variable frequency shift | N | internal subunits |
| 2.17 | Shift register AND gates | N | |
| 2.18 | Shift register AND gates | N | |
| 3.14 | Readout pulse generators | N | |
| 3.15 | Multiplexer gates | N | |
| 3.16 | Multiplexer gates | N | |
| 3.17 | Storage capacitors | N | |
| 3.18 | Storage capacitors | N | |
| 3.19 | Buffer amplifiers | N | |
| 4.1 | Alternation gates | 2N | |
| 4.4 | Multiplexer gates | 2N | |
| 4.16 | Variable frequency shift register | N | internal subunits |

FIG. 1 displays the entire analyzer-synthesizer system in a highly schematized fashion to show the broad organization of the primary elements. Signal sources 1.1, which may be any source of an electrical signal, such as a tape recorder, microphone, oscillator, communication system, or the like, is sampled at high frequency by the gates 1.2, which have the signal source 1.1 as a common input. These gates successively time-sample the potential of the signal source 1.1 and store these samples in storage capacitors 1.20. The gates 1.2 are controlled by a shift register 1.15 and additional control logic 1.4. The frequency at which the shift register 1.15 is excited and thereby the frequency at which the input signal source 1.1 is sampled is controlled by a clock contained in the control logic 1.4 whose frequency may be changed over a wide range. In addition, if the input signal frequency changes, the analyzer itself may be used to control the shift register frequency so that synchrony is achieved. In this case, the analyzer is said to be frequency tracking the input signal.

The potentials stored on the capacitors 1.20 excite the transformation matrix 1.3 via the gates 1.16. This transformation matrix computes various mathematical properties of the input voltage and produces output currents that are applied to the selection and conversion circuitry 1.5 through gates 1.17. The selection and gating conversion circuitry 1.5 chooses and uses various outputs of the matrix 1.3 for further computation. The gates 1.16 and 1.17 are driven by the control logic 1.4 and are short duty cycle gates that reduce the current loading on the capacitors 1.20 by the matrix 1.3. The combination of the transformation matrix 1.3 and the conversion circuitry 1.5 may be regarded as a single overall transformation of the matrix input voltages. The reason for showing both units is that it is convenient (especially for a Fourier representation) to use only linear impedance elements (particularly resistors) in the transformation matrix and to perform nonlinear transformations in a separate unit, in this case, labeled the conversion circuits 1.5. No such limitation is inherent in the scheme shown, however.

Outputs from the conversion circuits go to the deflection signal generator 1.6 for presentation on a cathode-ray oscilloscope 1.7. Typical operations by the deflection signal generator 1.6 are biasing for the cathode-ray tube spot position, control of the cathode-ray tube camera, and intensity control of the cathode-ray tube. The cathode-ray tube 1.7 could, of course, be replaced by any device capable of recording an electrical signal. If a cathode-ray tube 1.7 is used, one may photograph the presentation thereon. One specific application is the recording of the analyzer output(s), which may be signals that change with time, in which case the cathode-ray tube 1.7 may present a curve of the output function versus time on a film 1.8. The synthesizer is essentially the inverse device of the analyzer. In this case, recorded information in some form, such as a photograph, is used to synthesize an output electrical signal. If this information used by the synthesizer is that produced by the analyzer, then the output of the synthesizer is directly related to the input signal presented to the analyzer. In particular, one may select certain portions of the information contained in the input to the synthesizer, alter various portions or rearrange various parts to determine the contributions to the analyzer input signal of the various transformed elements of the signal provided by the transformation matrix 1.3. To this end, the film 1.8 is scanned by the cathode-ray tube 1.7 by sweeping the spot past the film 1.8 at high speed. The deflection signals for this scanning process are generated by the deflection signal generator 1.19. The information of the film 1.8 is sensed by the photodetector 1.12. The signal from the photodetector 1.12 is processed by the synthesizer digital control logic 1.13, which in turn controls the deconversion circuits 1.9. These deconversion circuits 1.9 provide the inverse function of the converter 1.5 in the analyzer.

The output from the photodetector 1.12 may contain the information necessary to control a number of matrix inputs in time sequence. Thus, the outputs from the deconversion circuits 1.9 may be used to generate signals that must then be distributed to storage capacitors 1.18, which store the values generated sequentially by the deconversion circuits.

The transformation matrix 1.10 performs the inverse computation to that performed by the analyzer transformation matrix 1.3. In fact, the two matrices may be physically identical if the matrix inputs and outputs are appropriately switched. The outputs of the transformation matrix 1.10 represent signals to be generated sequentially in time, in the fashion that they were applied to the analyzer, and sampled sequentially by the gates 1.2. Thus, an output multiplexer driven by the variable frequency shift register 1.15 sequentially gates the outputs of the matrix 1.10 onto a common output line 43 for recording, control, or sensing. The frequency of the shift register 1.15 may be changed over a wide range manually, or its frequency may be controlled by one of the curves on the film 1.8 being scanned.

The constant frequency shift register 1.21 provides the control signals for the selection and conversion circuits 1.5 and the deflection signal generator in the analyzer. These shift register control signals provide for the sequential selection of transformation matrix 1.3 outputs and the position of their display on the recording cathode-ray tube tube 1.7. In the synthesizer, the shift register 1.21 signals control the sequential scanning of the analyzer information stored on the film 1.8 being scanned. These shift register 1.21 signals also control the distribution of the serially occurring values being read from the film 1.8 to the storage capacitors 1.18 for application to the transformation matrix 1.10.

Figure 2:
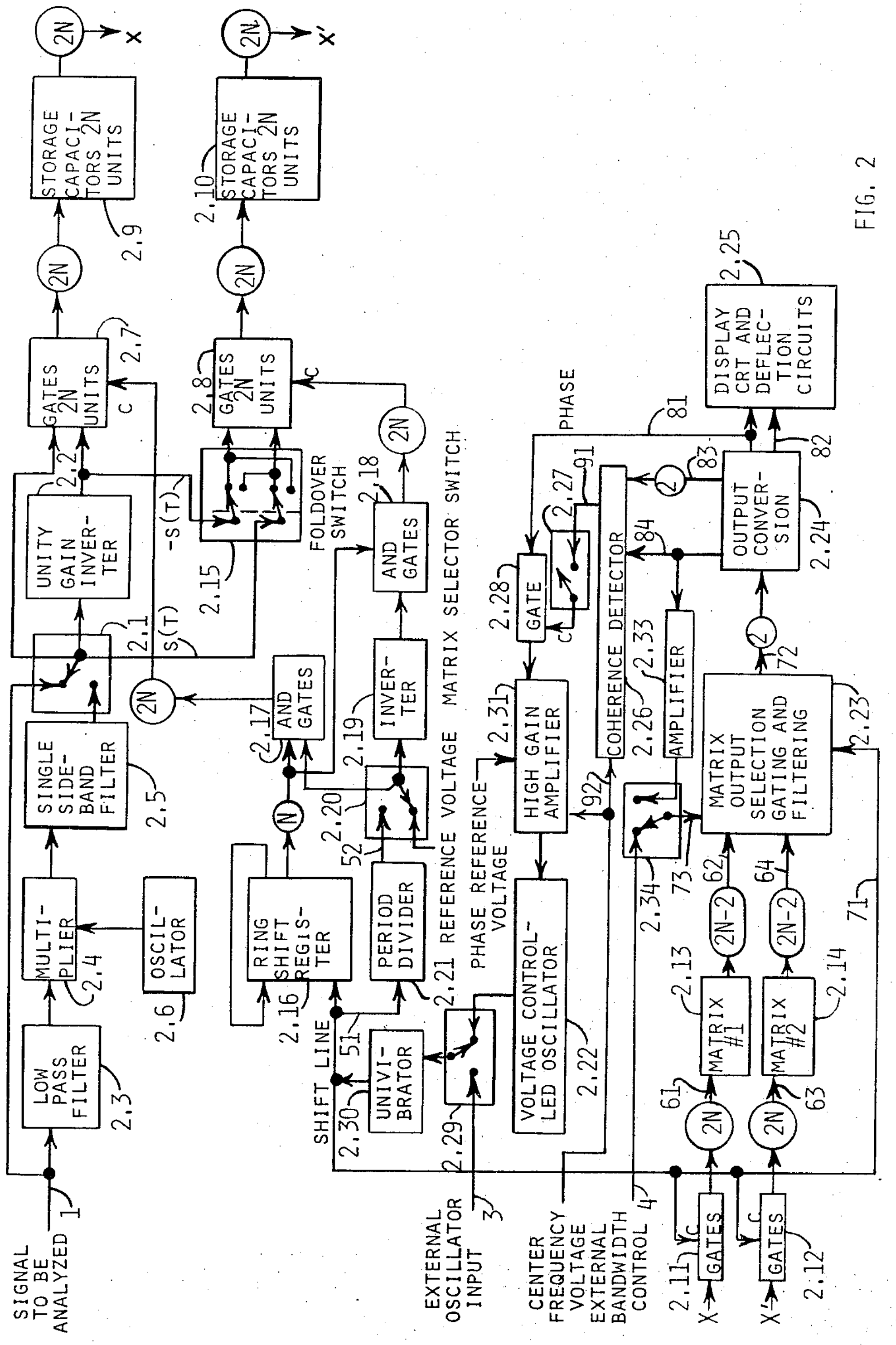
FIG. 2 is a block diagram of the analysis system.

FIG. 2 is a block diagram of the analysis system. In comparing FIg. 2 with the relevant analysis part of FIG. 1, several differences should be noted. In showing only the primary elements of the analysis system, FIG. 1 does not show an input heterodyning option, the use of two matrices with associated switching, external control of analysis frequency and bandwidth, and coherence detection. The addition of these functions to FIG. 2 involves the following units: Input heterodyning makes use of the low-pass filter 2.3, the oscillator 2.6, the multiplier 2.4, the filter 2.5, and the switch 2.1. The use of two matrices, rather than one, involves the addition of the period divider 2.21, the switch 2.20, the foldover switch 2.15, the inverter 2.19, the AND gates 2.17 and 2.18, the duplication of the storage capacitors 2.9, the gates 2.11, and a second matrix 2.14. External control of analysis frequency involves input line 3 and the switch 2.29. External control of bandwidth involves the input line 4 and the switch 2.34. Coherence detection requires the coherence detector 2.26 and the switch 2.27.

An input signal 1 to be analyzed is applied to a low-pass filter 2.3 and input selector switch 2.1. If the selector switch is in the position shown, the low-pass filter 2.3 is bypassed, and the signal directly excites the later stages of the analyzer. The low-pass filter 2.3 removes all frequency components above a specified frequency $\omega_1$. The output of the low-pass filter 2.3 is heterodyned (mixed) with the oscillator 2.6 signal whose frequency is denoted by $\omega_2$. The mixer 2.4 output drives a single-side-band filter (bandpass) 2.5, which passes frequency components between the frequencies $\omega_2$ and $\omega_1 + \omega_2$. The output of the bandpass filter 2.5 drives the selector switch 2.1. The filter 2.3, the mixer 2.4, the bandpass filter 2.5, and the oscillator 2.6 shift the frequency components of the input signal 1 up in frequency by the amount $\omega_2$, so that if frequency tracking is to be performed on the input signal 1, the fractional change in the frequency of the signal analyzed by the subsequent stage of the analyzer will not be so great as it would be without the heterodyning.

The selector switch 2.1 selects either the original input signal or the heterodyned signal for further processing. The signal chosen goes to the sampling gates 2.7, a unity gain inverter amplifier 2.2, and a second set of sampling gates 2.8 through the foldover switch 2.15. The output of inverter 2.2 is applied to the sampling gates 2.7 and also to the sampling gates 2.8 through the foldover switch 2.15. Thus, both sets of the sampling gates 2.7 and 2.8, which may be the same as the gates 1.2, are excited by the signal chosen by switch 2.5 and by the negative of this signal. The signal is applied to half of the sampling gates in both 2.7 and 2.8; the negative of this signal is applied to the remaining half of the sampling gates in both 2.7 and 2.8. The foldover switch 2.15 reverses the polarity of the inputs to the gates 2.8, while the polarity of the inputs to the gates 2.7 remains unaltered. N is the number of gates 2.7 and 2.8 attached to each input line. The sampling gates are simply controlled on-off devices, such as relays, transistors, etc. These gates are driven by the outputs of the AND gates 2.17 and 2.18, which in turn are driven by the chosen output of the matrix selector switch 2.20 and the shift register 2.16, which may be the same as shift register 1.15. If the matrix selector switch 2.20 is as shown, all the outputs of one set of AND gates, say 2.18, are in the OFF state and consequently all the gates 2.8 are also held in the OFF state and provide no further signals to the following circuits. In this case, the storage capacitors 2.9 and 2.10, the gates 2.12, and the transformation matrix 2.14 are also inactive. If the matrix selector switch 2.20 changes from the position shown, then the AND gates 2.17 and 2.18 are driven by the shift register 2.16, as before, but also by the output of the period divider 2.21. The sense (or polarity) of the period divider 2.21 applied to the AND gates 2.17 and 2.18 are opposite because of the presence of the inverter 2.19. The shift register 2.16 and the period divider 2.21 are driven by a univibrator 2.30, which in turn is driven either by the voltage-controlled oscillator 2.22 or the external oscillator input 3, determined by the setting of the clock selector switch 2.29. Each time a univibrator 2.30 pulse shifts the shift register 2.16, the period divider 2.21 is activated. The period divider 2.21 changes its sense (polarity) at a rate twice that of the univibrator 2.30 applied to it. Thus, for each new state of the shift register 2.16, activated by the univibrator 2.30, the period divider 2.21 first provides an ON signal to one set of AND gates, say 2.17, and then turns these OFF and provides an ON signal to the other set of AND gates 2.18. The function then of the voltage-controlled oscillator 2.22, the univibrator 2.30, the shift register 2.16, the period divider 2.21, the AND gates 2.17 and 2.18, and the inverter 2.19 is to provide the sampling gates 2.7 and 2.8 with a time sequence of ON-OFF control signals, where the ON signals are alternately applied to gates 2.7 and 2.8, or to provide a sequence of ON signals to the AND gates 2.7 only. The switch 2.20 thus provides a way of doubling the number of time samples without changing the cycle rate of the shift register 2.16.

The sampling gates 2.7 and 2.8 charge the storage capacitors 2.9 and 2.10, which may be the same as capacitors 1.20, to the input signal voltage when any respective gate 2.7 or 2.8 is turned ON. When the same gate is turned OFF, the respective capacitor 2.9 and 2.10 retains the last potential applied. The capacitance used in the instrument constructed was 1.0 ufd for each of the 4N condensers 2.9 and 2.10. Thus, the gates 2.7 and 2.8 and the storage capacitors 2.9 and 2.10 function as sample and hold gates. Other methods of accomplishing the sample and hold function are possible, such as analog-to-digital conversion of the signal and storage of the value of the potential in a digital memory and subsequent digital-to-analog conversion. The potentials on the storage capacitors 2.9 and 2.10 are applied to the transformation matrices 2.13 and 2.14, which may be the same as the matrix 1.3, through the gates 2.11 and 2.12, which may be the same as the gates 1.16 and which are turned ON by the univibrator 2.30, which drives the shift register 2.16, the gates 2.11 and 2.12, and the period divider 2.21. The sense of the univibrator 2.30 pulse is such that the gates 2.11 and 2.12 are turned ON by the univibrator 2.30 pulse and at the termination of this ON pulse, the shift register 2.16 is shifted. This procedure avoids the appearance of transients caused by the shift register 2.16 activation of the sampling gates 2.7 and 2.8 appearing at the inputs to the transformation matrices 2.13 and 2.14, since the storage capacitor 2.9 and 2.10 potentials are applied to the matrices for only a short interval of time just prior to the change of the state of the shift register 2.16. In addition, these gates 2.11 and 2.12 reduce the current drain on the storage capacitors 2.9 and 2.10 when the transformation matrices 2.13 and 2.14 consist of dissipative elements, such as resistors. This improves the overall accuracy of the matrix calculation by improving the holding accuracy of the voltage stored on capacitors 2.9 and 2.10.

Figure 6:
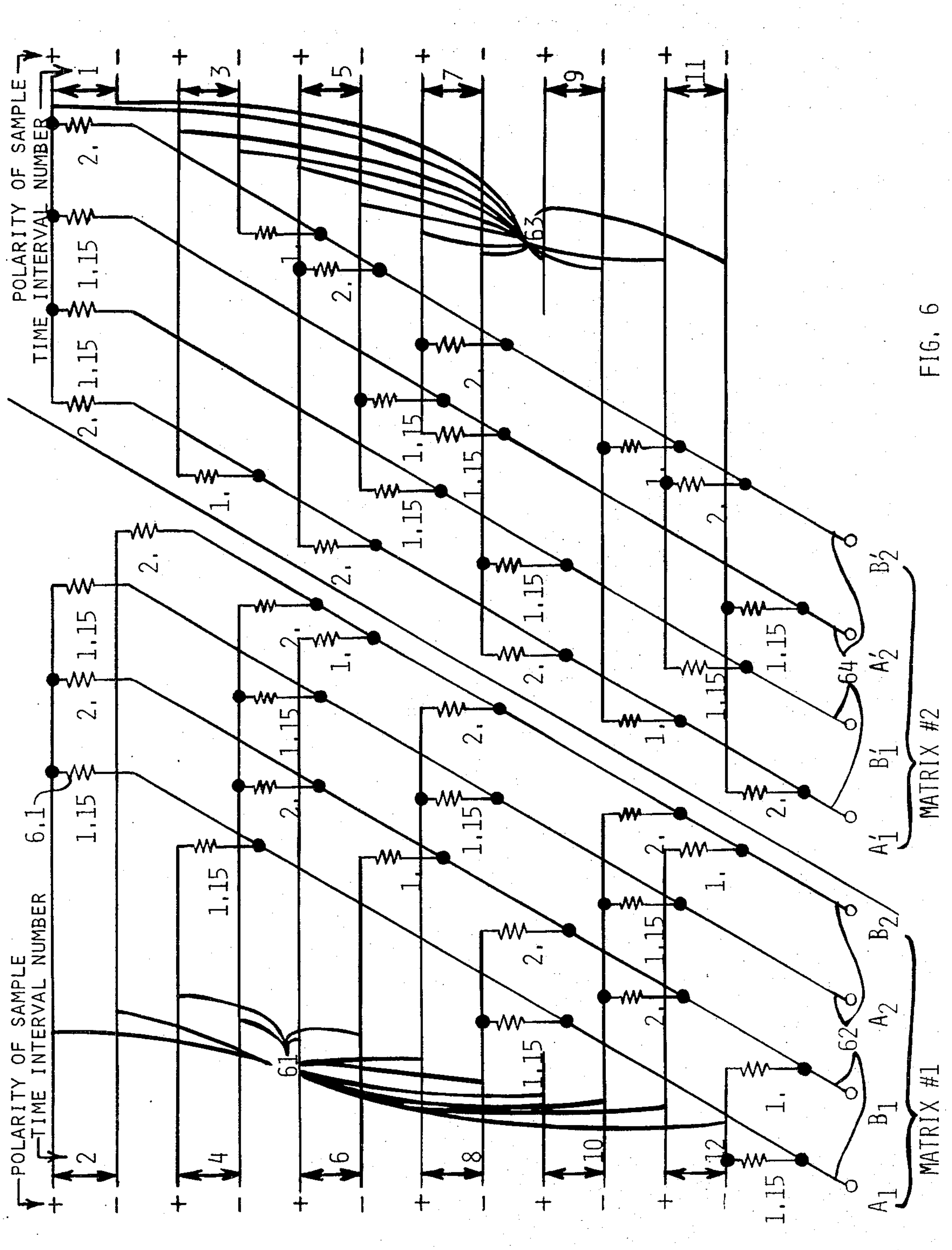
FIG. 6 is a schematic diagram of two Fourier series transformation matrices.
Figure 7:
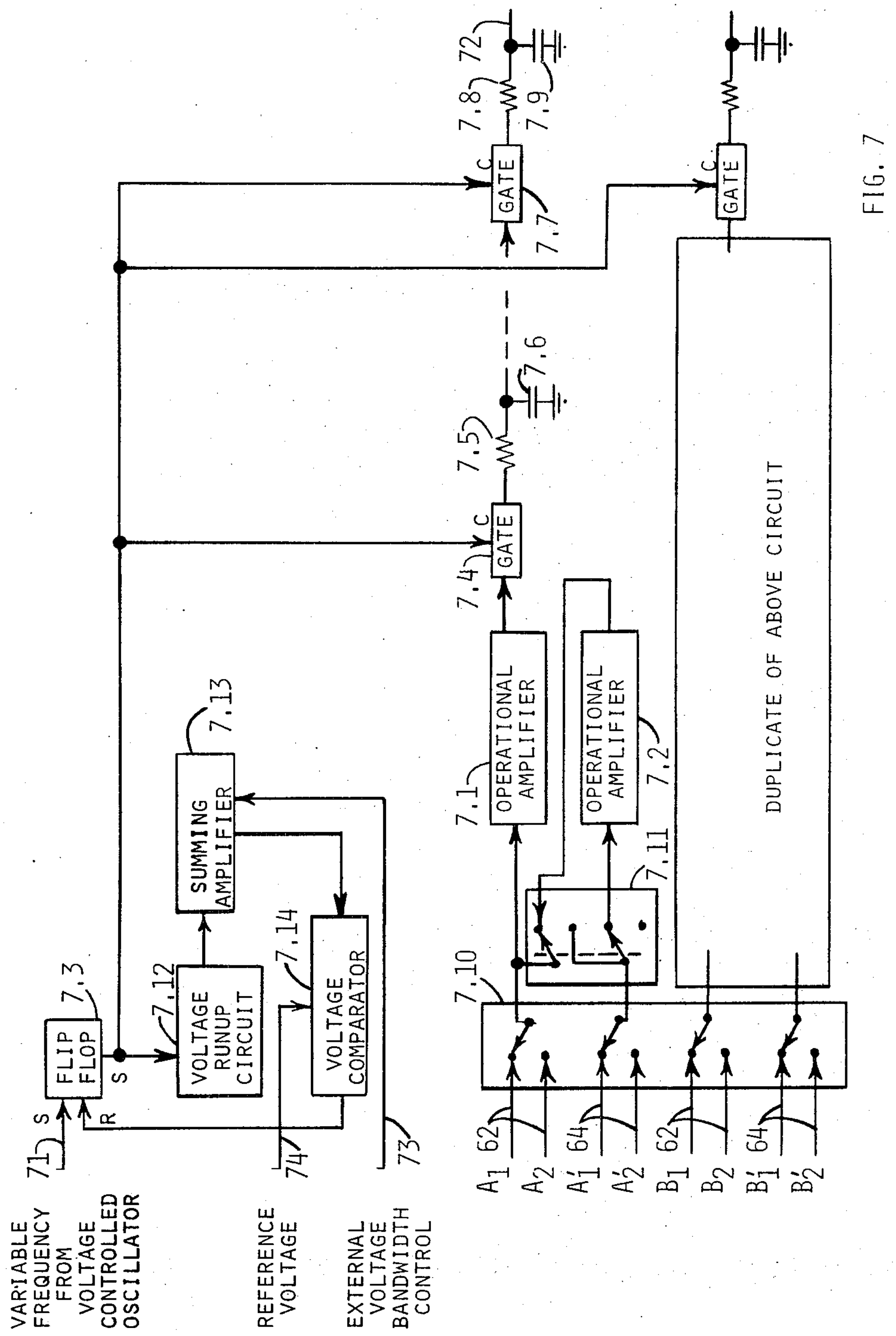
FIG. 7 is a block and schematic diagram of the matrix selection, gating, and filtering parts of the analysis system.

The use of two transformation matrices 2.13 and 2.14, whose inputs are alternate time samples of the waveform to be analyzed, is particularly useful in the case when a Fourier transformation is to be performed. In order to double the number of analyzed Fourier amplitudes, one would normally have to double the number of time samples and also double the number of matrix output lines, which would increase the number of matrix elements by four times. However, in the case of the Fourier frequency components, because of certain matrix symmetries, doubling the number of time samples, adding another matrix of the original size, and interleaving the time samples as indicated here, double the number of matrix outputs is achieved by taking the sum and difference of the two matrices of the original size. The sum and difference may be accomplished either by reversing the relative polarity of the inputs to the two matrices 2.13 and 2.14, as provided by the foldover switch 2.15, or by computing the sum or difference of the matrix outputs, as shown in FIG. 7, which is a detail description of the matrix output selection, gating, and filtering unit 2.23. In the instrument constructed, the number N is equal to 24, meaning that 48 time samples of the input waveform are taken and allowing the calculation of the phazor amplitudes of 23 Fourier frequency components. (The 24th component is the component of zero frequency or the average value of the input signal. It is also computed). By phazor components here we mean the resolution of a particular partial into sine and cosine components. FIG. 6, which is a detailed drawing of two typical matrices, shows two matrices for only four Fourier components, instead of the ones actually constructed, which contain about 600 resistors. Without the use of the interleaved-time-sample procedure described above, the matrices used would have required approximately 1200 resistors.)

The equations used for calculating the phazor components $a_n(t)$ and $b_n(t)$ for the $n$th frequency component are:

$$a_n(t)=\sum_{k=1}^{2K} f(t_k)\cos(n\omega_o t_k),\ n=1,2,\ldots K, \qquad (2.1)$$

$$b_n(t)=\sum_{k=1}^{2K} f(t_k)\sin(n\omega_o t_k),\ n=1,2,\ldots,K, \qquad (2.2)$$

where $$t=t_k-(\pi k/K\phi_o), \qquad (2.3)$$

and where $\omega_0$ is the fundamental frequency. Without loss of generality, we may take $t=0$. Using complex notation we find $$c_n=a_n(O)-b_n(O) \qquad (2.4)$$

$$=\sum_{k=1}^{2k} f_k H_{k,n} \qquad (2.5)$$

where $$f_k=f(t_k), \qquad (2.6)$$

$$H_{k,n}=\exp(i\pi kn/K). \qquad (2.7)$$

If, now, we decompose the matrix $H_{k,n}$ such that $$H_{k,n}=H_{k,n}^{o}+H_{k,n}^{e} \qquad (2.8)$$

where $$H_{k,n}^{o}=\delta_k \exp(i\pi k/K) \qquad (2.9)$$

$$H_{k,n}^{e}=\delta_{k+1} \exp(i\pi k/K) \qquad (2.10)$$

$$\delta_k=\begin{cases}0, & \text{if } k \text{ is even}\\ 1, & \text{if } k \text{ is odd}\end{cases} \qquad (2.11)$$

Thus, $H^e$ and $H^o$ are matrix elements corresponding to the even and odd time samples, respectively. It can be easily shown that $$H_{k,(K/2)-n}=H_{k,n}^{e*}-H_{k,n}^{o*} \qquad (2.12)$$

where $H^*$ denotes the complex conjugate of $H$. Since $$c_n=\sum_k f_k H_{k,n} \qquad (2.13)$$

$$=c_n^{o}+c_n^{e} \qquad (2.14)$$

$$c_n^{o}=\sum_k f_k H_{k,n}^{o} \qquad (2.15)$$

$$c_n^{e}=\sum_k f_k H_{k,n}^{e} \qquad (2.16)$$

We find that $$c_{(K/2)-n}=c_n^{e*}-c_n^{o*} \qquad (2.17)$$

Thus, one need only calculate the $c_n{}^o$ and $c_n{}^e$ for $0 < n < K/2$ and use equation 2.12 to compute $c_n$ for $K/2 < n < K$.

The output currents of the transformation matrices 2.13 and 2.14 go to the output selection, gating, and filtering unit 2.23, which chooses one or more of the matrix output lines for further processing. Since the inputs to the matrices 2.13 and 2.14 are applied only during the ON time of the univibrator 2.30, the particular matrix output lines that are selected are applied to current-to-voltage converting amplifiers (see 7.1 and 7.2) whose outputs are applied to sample and hold gates (see elements 7.4, 7.5, and 7.6), which sample the amplifier outputs while the storage capacitor 2.9 and 2.10 voltages are applied and store this sample until the next one is taken. Thus, the pulsed output of the matrices 2.13 and 2.14 is converted to a continuous signal. This continuous signal is now filtered to provide any additional frequency shaping of the matrix outputs 62 and 64. In the present instrument two types of additional filtering at this stage are available. The first type is a constant fractional bandwidth type of filter, which is achieved by variable duty cycle sampling disclosed in detail in FIG. 7, and a selectable constant band width integrator type filter, not shown in FIG. 7. Constant fractional bandwidth control filtering means constant with respect to the frequency of the voltage-controlled oscillator 2.22 or the external oscillator applied to line 3, whichever is selected by the switch 2.29 to trigger the univibrator 2.30. The particular fractional bandwidth used may be varied by changing the bandwidth control voltage on line 73. This control voltage may be an external control signal 4 or may be the output of amplifier 2.33, depending upon the setting of the switch 2.34. The input to amplifier 2.33 is a voltage proportional to the derivative of the phase output signal of the analyzer. If the frequency of the signal being analyzed and the analysis frequency are identical, this derivative will be zero and, in general, will be proportional to the frequency difference of the signal being analyzed and the output of the ring shift register 2.16. If the output of amplifier 2.33 is connected to the bandwidth control line 73, then the bandwidth will be inversely proportional to the detuning of the input signal at terminal 1 and the analysis frequency established by the ring shift register 2.16. If the analyzer is in the frequency tracking mode, in which the analyzer automatically adjusts the voltage-controlled-oscillator frequency so that the analysis frequency and the input signal frequency are the same, this bandwidth control method is useful for performing narrow band analysis while retaining the ability of wide band frequency tracking.

The outputs of the output selection, gating, and filtering unit 2.23, in the case where these are the Fourier phazor components, are further processed by the output conversion unit 2.24. The output processing units 2.23 and 2.24 may be the same as the gates 1.17 and conversion circuits 1.5. In this case, each pair of phazor components is converted to a voltage proportional to the Fourier phase. This phase voltage represents the relative phase of the input signal and the clock signal selected by the clock selector switch 2.29. This conversion is accomplished by modulating a high frequency carrier with the input phazor components, thereby creating a signal whose amplitude is the vector sum of the input phazor components and whose phase, relative to that of a high frequency clock in the conversion circuits, is that of the relative phase given by the phazor components. In addition, the phase function is differentiated with respect to time, giving a signal proportional to the difference of the ring shift register 2.16 and the input signal frequencies.

Outputs from the conversion circuits may be recorded on a cathode-ray oscilloscope 2.25, as is done in the present instrument, recorded in some other manner, or used for control purposes, and so forth. The cathode-ray tube and deflection circuits 2.25 may be the same as the cathode-ray tube and deflection circuits 1.7 and 1.6.

The relative phase of two signals is usually defined only for two signals whose frequencies are exactly the same. If the frequency of the signal to be analyzed 1 and the ring frequency of the shift register 2.16 are different, the phase output of the analyzer will increase or decrease continuously in time, requiring the restriction of the phase voltage to the phase angle range from 0° to 360°. As a result of this, the phase jumps by 360° regularly if the input signal and the shift register 2.16 ring frequency are different.

Lines 83 and 84 are control lines for the coherence detector 2.26. This coherence detector 2.26 determines whether the input signal is coherent, or noise, or incoherent. The coherence detector 2.26 works as follows: If the input signal on line 1 contains sufficient coherent signal content of a frequency sufficiently close to the ring frequency of the shift register 2.16, then a phase output will smoothly and monotonically change with time, as opposed to a totally noisy signal at the input 1 whose output phase function will also be noisy, i.e., random. The coherence detector 2.26 determines whether or not the absolute value of the phase derivative on line 84 is less than a prescribed value for a preselected period of time. If this is true, then a gate 2.28 control signal is turned ON until such a condition ceases to be true at which time the gate 2.28 control signal is turned OFF.

The gate 2.28 controlled by the coherence detector through the switch 2.27 switches the phase output of the analyzer to the voltage-controlled oscillator 2.22 through the amplifier 2.31. If the phase signal 81 is applied to the voltage-controlled oscillator 2.22 through amplifier 2.31 the analyzer is said to be in the frequency tracking mode, a mode in which the frequency of the voltage-controlled oscillator 2.22 is changed (by the whole system) such that the phase output remains approximately equal to the phase reference voltage applied to amplifier 2.31. The center frequency of the voltage-controlled oscillator 2.22 may be changed manually to match as closely as possible the expected center frequency of the input signal applied. The coherence detector 2.26 and the gate 2.28 prevent the analyzer from attempting to track the nonexistent frequency of a noisy signal. This detector 2.26 is not essential to the frequency tracking process, however. The switch 2.27 provides a way of eliminating frequency tracking by preventing the coherence detector 2.26 from turning ON the gate 2.28. The gate 2.28 could also be controlled manually or by some other external control signal.

The low-pass filter 2.3, the oscillator 2.6, the multiplier or modulator 2.4, and the single-sideband filter 2.5 heterodyne the input signal to a higher frequency thereby enabling the frequency tracker to follow signals whose frequency changes substantially fractionally. Heterodyning reduces the fractional frequency change and, therefore, the change required of the voltage-controlled oscillator 2.22.

The voltage controlled oscillator 2.22 could be excited by one of the outputs of the transformation matrices 2.13 or 2.14, such as outputs 62 or 64. A phase calculator would then be unnecessary.

Figure 3:
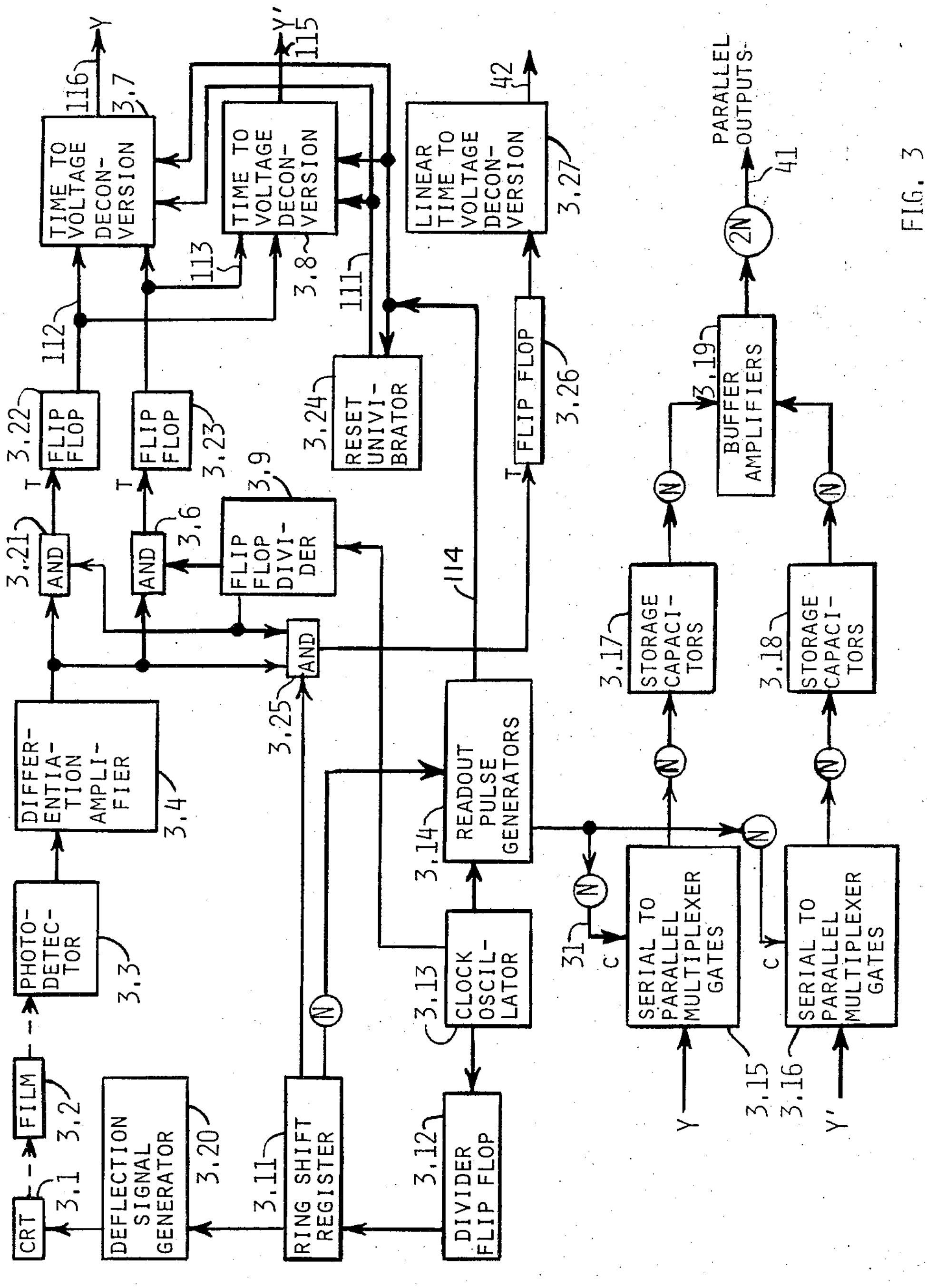
FIG. 3 is a block diagram of the partial control generator, the initial stages of the synthesis system.

FIG. 3 is a block diagram of the partial control generator, which is a part of the synthesizer. This particular part of the synthesizer generates a set of voltage control signals for the synthesizer transformation matrix 1.10 from curves that are on film 3.2 or some other supporting base.

A cathode-ray tube 3.1, which may be the same as the cathode-ray tube 1.7, produces a spot of light which is moved across the cathode-ray tube face by the deflection generators 3.20. The spot of light is focused on the film 3.2, which may be the same as the film 1.8, containing curves or other forms which vary the light transmission properties. Whenever the spot is focused on a region that transmits light, say a curve, this light is sensed by the photodetector 3.3. The current from the photodetector 3.3 is differentiated with respect to time and amplified by the amplifier 3.4. The photodetector 3.3 and the amplifier 3.4 may be the same as the photodetection system 1.12. The differentiation of the current generated by the photodetector 3.3 produces a convenient signal for detecting precisely the instant that the cathode-ray tube spot is focused on the center of the line being traversed. This derivative is particularly easy to compute for properly biased photomultipliers, since the light activated current available at such a photodetector's output is essentially independent of the potential applied to the output terminal of the detector. A single, high quality inductor provides a voltage signal proportional to the derivative of the photodetector current. This voltage is amplified sufficiently to saturate the amplifier, thereby providing a very rapid transition at the amplifier's output at the instant the derivative of the photomultiplier 3.3 signal passes through zero. This procedure allows one to determine easily the relative positions of curves on the film 3.2 being scanned to a tolerance much smaller than the size of the spot focused on the film. The time-derivative zero crossing is independent of secular changes in intensity of the scanning spot.

A multiplicity of curves are presented on a single film 3.2 in the present invention, the various curves being scanned sequentially in time by the cathode-ray tube 3.1 focused spot. The scanning is controlled by the ring shift register 3.11, which may be the same as shift register 1.21, via the deflection signal generator 3.20, which may be the same as the deflection signal generator 1.19 and which is shifted by the clock oscillator 3.13 via the frequency divider 3.12 and the shift register 3.11. The clock oscillator 3.13 is of fixed frequency and also controls further processing of the photo-multiplier amplifier 3.4 output via the divider 3.9 and the readout pulse generator(s) 3.14. The frequency divider 3.9 splits the pulse train from the photodetector amplifier 3.4 into two pulse trains via the AND gates 3.6 and 3.21. The AND gate 3.25, whose inputs are one of the shift register elements in the ring shift register 3.11 and the flip flop divider 3.9, gates the photodetector generated pulses, occurring during one half of a particular ring shift register interval, to the linear time-to-voltage deconversion unit 3.27. The two pulse trains from the AND gates 3.6 and 3.21 are used to toggle the two flip flops 3.22 and 3.23. The pulse train is now presumed to consist of pairs of pulses, where the time between the two pulses in a pair contains the information to be used from the film. This time is, of course, related to the scanning rate of the cathode-ray tube spot across the film 3.2 and the spacing of various pairs of curves on the film. A curve containing information plus a reference baseline for this curve produces a pair of pulses from the photodetector amplifier 3.4 when both are sequentially scanned by the cathode-ray tube spot. The time between the occurrence of the pulses in the pair is proportional to the spacing of the curve and its reference baseline, since the scanning rate of the cathode-ray tube is uniform in time. In the case where Fourier amplitudes and phases are recorded on the film, two adjacent curves with their associated baselines represent, respectively, the Fourier phase and the logarithm of the Fourier amplitude. The flip flops 3.22, 3.23, and 3.26 are turned ON and then OFF by a baseline-curve pulse pair, resulting in an ON time that is proportional to the spacing of a curve and its associated baseline. For the Fourier phase and amplitude curves one flip flop 3.22 is ON for a time proportional to the phase, and the other flip flop 3.23 is ON for a time proportional to the logarithm of the amplitude. The time-to-voltage deconversion circuits 3.7 and 3.8, which have the phase-time flip flop 3.22 and the log-amplitude-time flip flop 3.23 as inputs, the univibrator 3.24, and the readout-pulse generator 3.14 generate the Fourier phazor components from the phase and log amplitude inputs. The linear time-to-voltage deconversion circuit 3.27 generates a potential that is directly proportional to the time between the pulse pair used to toggle the flip flop 3.26. The curve from which this pulse pair is derived may be a Fourier phase curve. This deconversion circuit 3.27 is optionally used for frequency control of the later stages of the synthesizer. This procedure is particularly useful where the phase curve read is proportional to the frequency of the voltage-controlled oscillator of the analyzer 2.22, as will be the case if the Fourier component is used for frequency tracking in the analysis is the curve used by the deconversion unit 3.27. Since a number of such Fourier phazor components may be generated in a single scan of the cathode-ray tube 3.1 spot across the film 3.2, which may contain a number of curves, the signals generated by the deconversion circuits 3.7 and 3.8 must be stored in a parallel manner if continuous control signals are to be available. The serial-to-parallel multiplexer gates 3.15 and 3.16 perform this function by reading out the sequential potentials generated by the deconversion circuits into storage capacitors 3.17 and 3.18, whose capacitance was 0.1 ufd in the instrument constructed. This readout procedure is controlled by the shift register 3.11 and the readout pulse generators 3.14, which generate a short pulse on each line of the set 31, which, in turn, via the multiplexer gates 3.15 and 3.16, cause the potentials to be stored on the appropriate capacitor of sets 3.17 and 3.18. The termination of the readout pulse causes the univibrator 3.24 to trigger ON for a short duration. This univibrator 3.24 via line 111 resets the deconversion circuits 3.7 and 3.8 so that they are ready to process the next set of signals from the flip flops 3.22 and 3.23. The storage capacitors are followed by the impedance buffer amplifiers 3.19, which have very high input impedances to minimize the changes of the potentials of the storage capacitors 3.17 and 3.18, and low output impedances to drive the matrix input lines 41. The deconversion circuits 3.7, 3.8, and 3.27, and the gates 3.15 and 3.16 may be the same as the deconversion and distribution circuit 1.9.

All of the above functions, from the deflection signal generation to the final storage of the deconverted signals on the storage capacitors, are synchronized to the clock oscillator 3.13, which in the instrument constructed is a crystal oscillator that has a frequency of about 32 kcs. The ring shift register 3.11 has 24 elements providing one scan of the cathode-ray tube spot across the film 3.2 in 1.5 msec. During this 1.5 msec, 22 curves with their associated baselines are read and deconverted. The photodetector triggering circuits provide curve positioning accuracy corresponding to 0.02 percent of the total scan length of 3 in. actually used.

Figure 4:
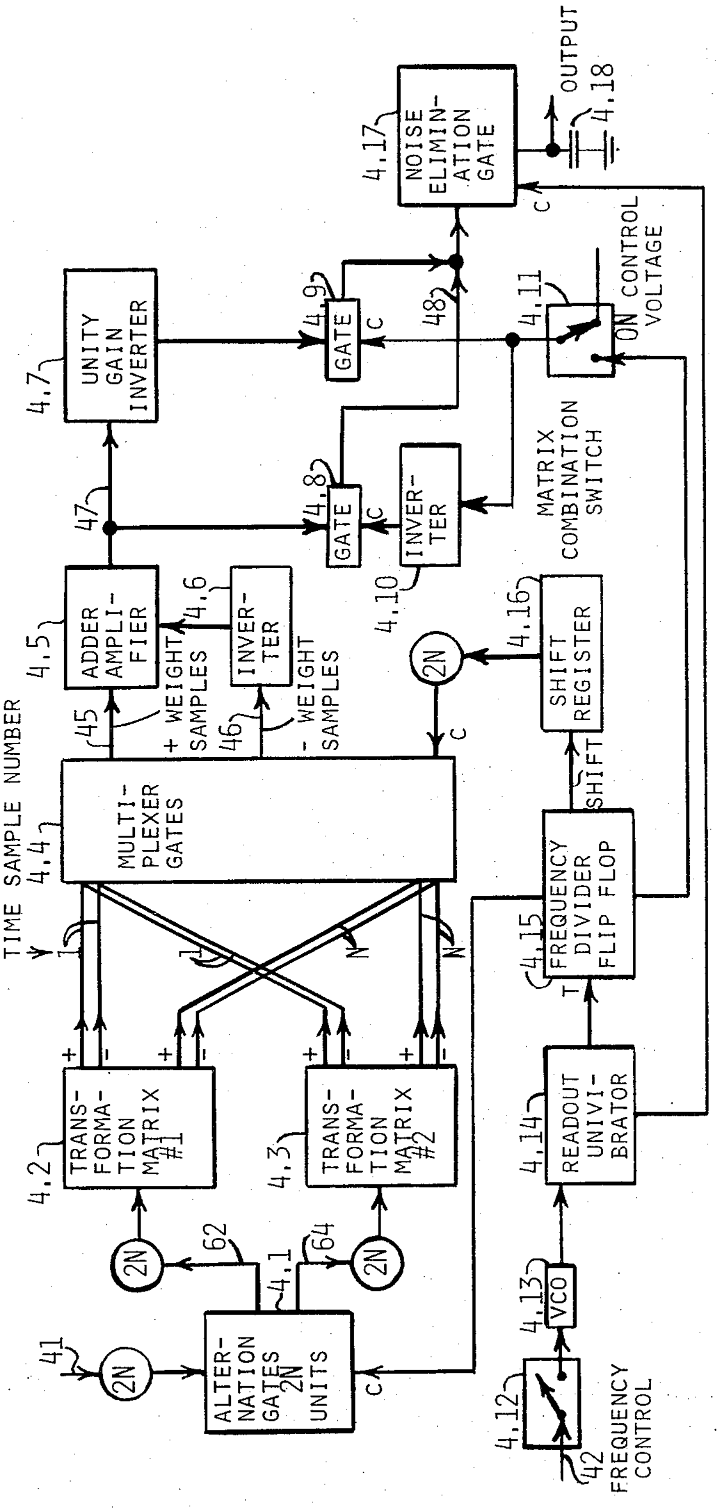
FIG. 4 is a block diagram of the time sample generator part of the synthesis system.

FIG. 4 displays a second part of the synthesizer, a part that is controlled by the partial control generator shown in FIG. 3. The 2N parallel outputs from the impedance buffer amplifiers 3.19, shown in FIG. 3, are the inputs to the 2N alternation gates 4.1. These gates transmit the 2N inputs alternately to transformation matrices No. 1 and No. 2. All 2N gates operate in a parallel manner and are driven by the frequency divider flip flop 4.15. The frequency divider flip flop 4.15 changes its output state at the termination of a univibrator 4.14 pulse, which is triggered by the voltage-controlled oscillator 4.13, which may be the same as the voltage-controlled oscillator 2.22. This voltage-controlled oscillator 4.13 is a variable frequency oscillator whose center frequency may be set manually and whose output frequency may be varied by the application of a frequency control signal 42 if the frequency control switch 4.12 is closed. If this switch is closed, then a curve appearing on the film 3.2 may be used to control the frequency of the voltage-controlled oscillator 4.13.

The transformation matrices 4.2 and 4.3, which may be the same as matrix 1.10, perform the inverse function of matrices 2.13 and 2.14 in the analyzer. The outputs of the transformation matrices 4.2 and 4.3 in the synthesizer now are currents that are to be summed to generate successive time samples of a synthesized waveform. For each output time sample, there are matrix currents that must be weighted oppositely with respect to polarity, since it is not possible to multiply or weight a matrix input signal by a negative amount with ordinary, passive electrical components, such as resistors. For reasons identical to those discussed in connection with the analyzer matrices 2.13 and 2.14, the use of two matrices combined with sign (polarity) reversal of one relative to the other allows the generation of twice the number of Fourier frequency components by only doubling, rather than quadrupling, the number of matrix components.

At any particular instant, only one matrix contributes to the time sample generated in the synthesizer. The polarity of one matrix relative to the other is reversed by reversing the polarity at the output of the synthesizer of the successive time samples generated by the matrices 4.2 and 4.3 in synchronism with the switching of the alternation gates 4.1, as will now be discussed more fully.

The frequency divider flip flop 4.15, which controls the matrix alternation gates, drives the shift register 4.16, which may be the same shift register as 2.16 and/or 1.15. Shift register 4.16 turns ON, in time sequence, pairs of gates in the multiplexer gates 4.4, which may be the same as the gates 1.11. Lines representing sequential time samples to be weighted with the same polarity with respect to individual matrix computations from the two matrices drive a common gate. All outputs from these common matrix polarity gates 4.4 are multiplexed sequentially onto a common output line, there being N gates associated with each polarity. These 2N gates are turned ON sequentially by the 2N lines from the shift register 4.16. There are two common output lines 45 and 46 from the multiplexer gate 4.4, representing outputs that are to be differenced. This is accomplished by the amplifiers 4.5 and 4.6. Amplifier 4.6 converts the sum of the matrix currents on one common line 46 into a proportional output voltage with polarity reversed. A current proportional to this voltage and the current on the other multiplexer common line 45 are summed in the amplifier 4.5 whose output potential is proportional to the sum of its inputs.

The output of the adder amplifier 4.5 now contains contributions from matrix No. 1 and matrix No. 2 in time sequence. An inverter amplifier 4.7 inverts the output of amplifier 4.5 so that both polarities of this alternating signal are simultaneously available. The gates 4.8 and 4.9, which are driven by the common output of the matrix combination switch 4.11 and the inverter 4.10, are always in opposition (one is ON and the other is OFF) due to the inverter 4.10. If the matrix combination switch 4.11 is connected to a fixed ON control voltage, then gate 4.8 is OFF (due to the inverter) and the gate 4.9 is ON. In this case, the signal appearing on the output line common to gates 4.8 and 4.9 is the signal generated by the inverter amplifier 4.7. Thus, successive time sample outputs generated by the switching of the matrix inputs by the alternation gates 4.1 are not reversed in polarity. However, if the matrix combination switch 4.11 is changed so that the gates are driven by the frequency divider flip flop 4.15, which also drives the matrix alternation gates 4.1, the common output line of the gates 4.8 and 4.9 is alternately connected to amplifiers 4.5 and 4.7 the outputs of which are of opposite polarity. The common output line 48 of the gates 4.8 and 4.9 goes to the noise elimination gate 4.17. Because of the switching of the matrix alternation gates 4.1, the multiplexer gates 4.4, and the gates 4.8 and 4.9, there may be undesirable switching transients appearing at the common output 48 of the gates 4.8 and 4.9. As previously discussed, all the above switching actions are synchronized to the univibrator 4.14, which toggles the frequency divider flip flop 4.15 at the termination of the ON time of the univibrator 4.14 pulse. This ON period of the univibrator 4.14 turns on the noise elimination gate 4.17 for a short interval just prior to switching action initiated by the change of state of the flip flop 4.15. The voltage signal appearing at the common output line 48 of gates 4.8 and 4.9 is gated onto the output holding capacitor 4.18. Since this ON period of the noise elimination gate occurs just prior to any switching of the matrix associated lines, the system transients caused by the previous switching actions have decayed to as low a value as possible before new switching transients can occur. The output holding capacitor 4.18 thus "sees" a signal which is as free of transients as is possible to achieve. This holding capacitor 4.18 is needed to provide a continuous signal output, since the noise elimination gate 4.17 is presumed to be turned ON for only a small fraction of the time.

This output holding capacitor 4.18 potential may be recorded for further use, audited, and so on. Specifically, this output signal may be compared with the corresponding analyzer input signal used to generate the information (stored on film) and to control the synthesizer. This comparison aids in determining the accuracy and/or adequecy of the representation of the signal implemented by the transformation matrices used in the analyzer and synthesizer.

Figure 5:
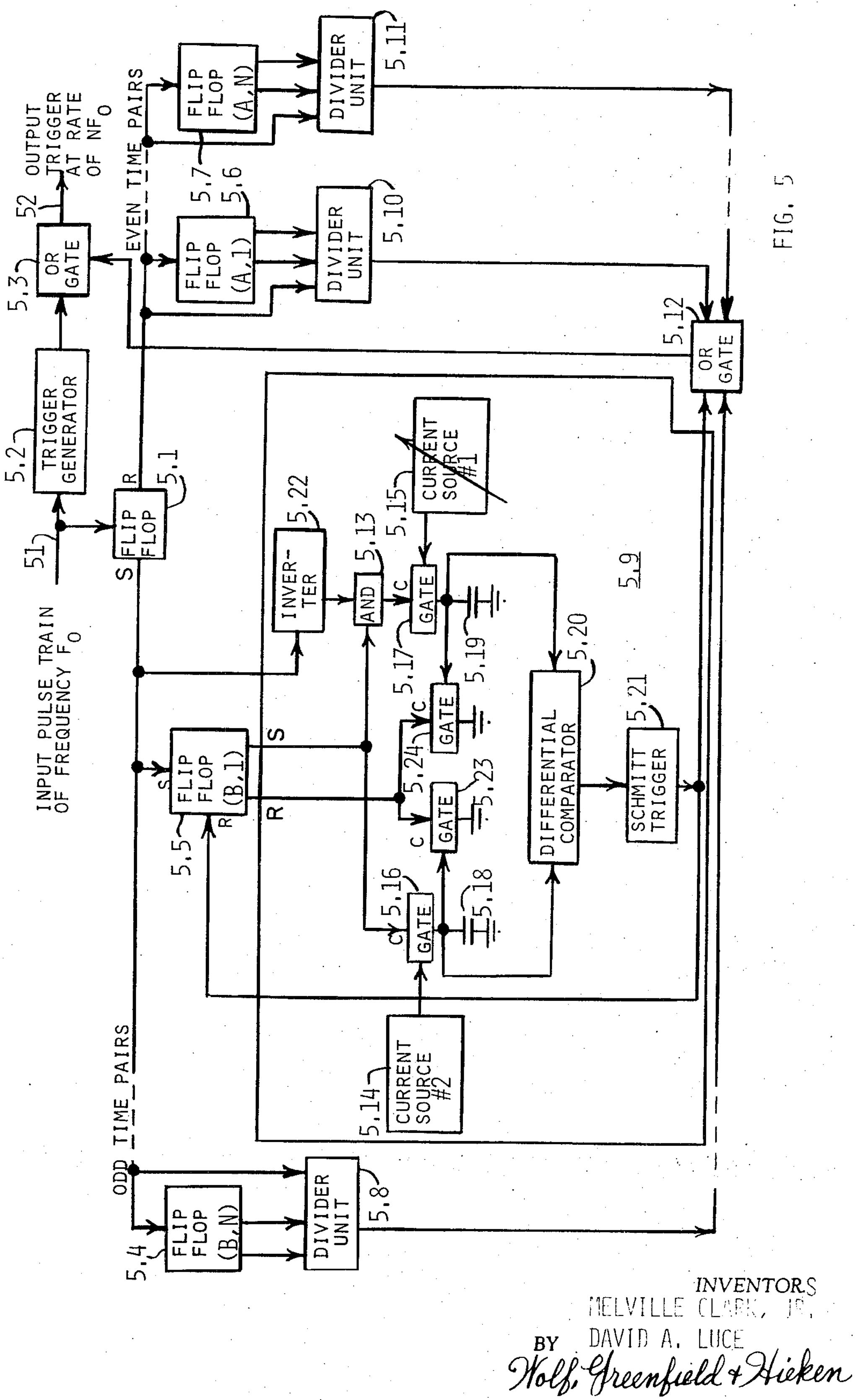
FIG. 5 is a detailed schematic and block diagram of the period divider.

FIG. 5 is a detailed schematic and block diagram of the period divider 2.21. This circuit is excited by a train of pulses at its input 51. If the input-pulse train has a constant repetition rate at a frequency f, then the output 52 of the period divider will contain pulses occurring at a rate greater than that of the input pulse train 51. If the number of subunits similar to the divider sections 5.8, 5.9, 5.10, and 5.11 is $m$, then in general $m/2$ pulses may be produced in between the pulse pairs at the input 51. For example, with two units, say 5.9 and 5.10, one additional pulse may be inserted between each pulse pair of the input train at 51. The circuits 5.9 and 5.10 produce a pulse in the output 52 at a time after a particular pulse corresponding to a constant fraction of the time elapsing between the previous pair of input pulses used to excite each unit. This fractional position may be changed by varying the magnitude of the current delivered by the current source 5.15. Again, if two units 5.9 and 5.10, say, are used, and the current source in each unit is adjusted so that the fractional position discussed above is one-half, then the two units would alternately provide an output pulse half way between successive pulse pairs, doubling the pulse frequency of the input. This alternation is caused by the divider flip flop 5.1. For example, assume pulse number one in the input pulse train 51 sets the flip flop 5.1. Pulse number two in the input pulse train will reset flip flop 5.1, since the input pulse train toggles this flip flop. Pulse number three will then set the flip flop 5.1. Thus, the set input driving unit 5.9 will be ON for the period of time between pulses one and two, and the reset input from flip flop 5.1 will be ON for the time between pulses number two and three. Flip flops 5.4, 5.5, 5.6, and 5.7 are transition triggering types, so that, when a set input is activated, the flip flop can be reset only by activation of the reset input and not through any signal change on the set input. Thus, when flip flop 5.1 sets due to pulse number one (set output goes ON), flip flops 5.4, 5.5, and any other connected to the set output of flip flop 5.1 go to the set state. This turns ON the gate 5.16, which allows current to flow to the capacitor 5.18, whose potential begins to increase. When flip flop 5.1 resets, due to pulse two, its set output goes OFF, which does not change the ON state of flip flop 5.5, but does turn ON the gate 5.17 through the inverter 5.22 and the AND gate 5.13. The gate 5.17, when turned ON, allows current to flow to the capacitor 5.19, whose voltage now begins to increase. The rate of rise of voltage of capacitor 5.19 is greater than the rise rate of the voltage of capacitor 5.18. Sometime between pulse number two and three, the two potentials, while increasing, become equal. The shunt gates 5.23 and 5.24 have been turned OFF by the reset output of flip flop 5.5, while the capacitor voltages are increasing. The voltages of the capacitors 5.18 and 5.19 are applied to a voltage comparator 5.20, which is a high gain differential amplifier that produces a very rapidly changing output voltage signal when the potentials of the two capacitors 5.18 and 5.19 pass through the point of equality. This rapid transition of the comparator 5.20 is detected by the Schmitt trigger 5.21, which produces a voltage transition which resets the flip flop 5.5. This Schmitt trigger signal also appears at the output 52 via the OR gates 5.12 and 5.3. When flip flop 5.5 resets, the shunt gates 5.23 and 5.24 are turned ON, which dumps the charges of the capacitors 5.18 and 5.19 and causes the potential across them to be zero. The time between pulse number two and three (in the input pulse train 51) at which the equality of the capacitor voltages occurs depends on the magnitude of the current sources 5.14 and 5.15, the size of the capacitors 5.18 and 5.19, and the period of time between pulses number one and two. In general, the divider units, like 5.8 and 5.9, connected to a common output line of 5.1 will provide an output pulse somewhere in time between the input pulse numbers two and three, depending on the period of time between the input pulse numbers one and two. Alternate gaps between input pulse pairs are provided alternately by the divider units connected to the two outputs of flip flop 5.5.

The above description indicates that the period divider may be used for multiplying the frequency of occurrence of input pulses. This frequency of pulses need not be constant. If the frequency of these input pulses does vary in time, the period divider will follow these variations delayed by the time between a previous pair of pulses.

The period divider may also be used to generate an arbitrary time sequence of pulses (or intervals) at a variable fundamental repetition rate.

Another use of the period divider would be the synchronization of a relatively high frequency oscillator signal to a lower frequency one by using the period divider as a frequency multiplier of the low frequency signal. Specifically, a period divider output external to the analyzer can be used to excite the external oscillator input 3, so that the signal controlling the analyzer, via the period divider, may be a submultiple of or equal to the shift register 2.16 ring frequency. Thus, one might use the input signal itself, via a trigger generator sensing the input and exciting the period divider, to control the analyzer frequency which drives the univibrator 2.30.

FIG. 6 is a schematic diagram of two Fourier series transformation matrices. The time sample inputs 61 and 63 are shown with two polarities for each time point. Since these matrices contain only passive electrical components, specifically resistors, and since the Fourier series calculation of the Fourier phazor components involves the multiplication of the time signals by negative values, the sign of half of the time sample inputs is reversed, i.e., made negative with respect to the positive samples, which gives the desired result. Resistor 6.1 is a typical one connecting a time sample line with one of the Fourier phazor component lines 62 and 64. It should be noted tat sequential time samples are applied alternately to matrix No. 1 and matrix No. 2. Then, as discussed previously, by taking sums or differences of the matrix inputs or outputs, one gets transformations related to different Fourier frequency components.

The particular matrices shown in FIG. 6 give the transformation from 12 time sample points to the first, second, fourth, and fifth Fourier components. Relative resistance values are determined by setting the resistor conductances equal to the input time sample weighting desired. Specifically, referring to equation 2.3, the relative conductances are equal to the values of the corresponding elements of the matrices $H_{k,n}^o$ and $H_{k,n}^e$. FIG. 6 displays the matrices for the case $N = 12$. The matrices $H_{k,n}^e$ and $H_{k,n}^o$ are on the left and right sides of FIG. 6, respectively. The time sample number given in FIG. 6 corresponds to the matrix subscript $k$. The subscript on the A's and B's on lines 62 and 64 in FIG. 6 refer to the matrix index $n$. The A and B designations on lines 62 and 64 in FIG. 6 refer to the real and imaginary parts, respectively, of the matrix element associated with the relevant value of the index $n$. In the case where either the real or imaginary part of a matrix element is negative, it is entered in FIG. 6 in the relevant negative-polarity time-sample line, since whenever a matrix element has a negative part, the negative (inverted) input signal is multiplied by the positive value of the negative element achieving the correct overall sign in the sum given in equation 2.3. If the currents in lines $A_1$ and $A_1'$ are added and the currents in lines $B_1$ and $B_1'$ are added, the two resulting summed currents are proportional to the Fourier phazor components of the fundamental or lowest frequency components. If, instead of the sums, we compute differences, then the two difference currents are proportional to the Fourier phazor components of the fifth Fourier frequency component. In a similar fashion the lines $A_2$ and $A_2'$, and $B_2$ and $B_2'$ may be combined to give the Fourier phazor components of the second and fourth frequency components. Only the relative resistance of each resistor is shown. Typical resistances normally used are in the kilo-ohm to megohm range.

FIG. 7 is a block and schematic diagram of the matrix selection, gating, and filtering operations. Lines 62 and 64 are the matrix output lines shown in FIG. 6 that carry currents which are proportional to the transformed version of the time samples applied to the transformation matrices, 2.13 and 2.14, and in particular may represent the Fourier phazor amplitudes. The partial selector switch 7.10 selects four of the matrix output lines for further processing. Two lines from each matrix are selected, the pair from each matrix corresponding to a particular Fourier frequency component. The two lines representing a particular phazor component from different matrices, say $A_1$ and $A_1'$, are connected to the output summing amplifiers 7.1 and 7.2 which convert their input currents to proportional voltages in the output. If the matrix combination selector switch 7.11 is in the position shown, the current from lines $A_1'$ is inverted and thereby subtracted from the current being summed by amplifier 7.1. Thus, the voltage appearing at the output of amplifier 7.1 is proportional to the difference of the currents flowing in the lines $A_1$ and $A_1'$. If switch 7.11 is changed to the other position, then the lines connected to $A_1$ and $A_1'$ by the switch 7.10 are connected together, and the currents in these two lines are summed directly by the amplifier 7.1, which produces an output proportional to this sum.

The output of amplifier 7.1 is applied to a gate 7.4, which is controlled by the flip flop 7.3. Referring to FIG. 2, we see that this flip flop 7.3 is set synchronously with the turning on of the matrix strobing gates 2.11 and 2.12. Thus flip-flop 7.3 is set at the same time that the matrix input sample voltages held on the storage capacitors 2.9 and 2.10 are applied to the transformation matrices 2.13 and 2.14. When flip flop 7.3 is set, the gate 7.4 is turned ON, and, since the matrix has voltages applied to its time sample input lines 61 and 63, the voltage output of amplifier 7.1 represents useful transformation information. The set output of the flip flop 7.3, which controls gate 7.4, also controls a voltage runup circuit 7.12, which, when the flip flop 7.3 sets, produces an output voltage that increases with time. The voltage output of the runup circuit 7.12 is summed with the bandwidth control voltage 73 by the summing amplifier 7.13, and the summed output voltage of said amplifier 7.13 is compared with a reference voltage by the comparator 7.14. The comparator 7.14 produces an output pulse when the two voltages applied to the comparator 7.14 are equal. This output pulse resets the flip flop 7.3, which turns the gate 7.4 OFF. The duration of time for which the flip flop 7.3 is set is thus determined by the bandwidth control potential 73. This control acts in such a way as to decrease the flip flop 7.3 set time as the bandwidth control potential 73 increases. The reference voltage 74 is chosen so that the flip flop 7.3 set time is always less than the univibrator 2.30 ON time to prevent false information being gated into the resistor 7.5.

During the set time of the flip flop 7.3, the voltage from the amplifier 7.1 is applied to the resistor-capacitor combination 7.5 and 7.6. Capacitor 7.6 now begins to charge up to the voltage applied to the resistor 7.5. If the resistance of the resistor 7.5 is very small, then the capacitor voltage will rise to that at the output of the amplifier 7.1 and, when the flip flop 7.3 is reset, the capacitor 7.6 will act as a storage capacitor, holding the potential applied until the next flip flop 7.3 set time occurs. If, however, the resistor 7.5 is large enough so that the voltage of the capacitor 7.6 does not follow the voltage output of the amplifier 7.1, then the resistor-capacitor combination will be acting as a low-pass filter, since the more rapidly varying the signal appearing at the amplifier 7.1 output, the less completely will the capacitor 7.6 be able to follow this amplifier's output. Typical values used for the resistor 7.5 and the capacitor 7.6 are 200 ohms and 0.1 ufd.

It is to be noted from FIG. 2 that the flip flop 7.3 is driven, via line 71 by the univibrator 2.30 which in turn is driven by either the voltage-controlled oscillator 2.22 or an external oscillator, both of which may vary over a wide range of frequency. Thus, the frequency of the gating signals generated by the flip flop 7.3 will vary over a wide range. As noted previously, the pulse width will depend on the bandwidth control voltage 73. The combination of the variable frequency setting of flip flop 7.3, and its variable duration gives an overall set time duty cycle of flip flop 7.3 which is proportional to the product of the analysis frequency, and the difference of a reference voltage 74 and the control voltage 73. In relation to the filtering action of the gate 7.4, resistor 7.5, capacitor 7.6 combination, the gate-resistor combination can be considered to be an equivalent resistor, the total effective resistance of the combination being the resistance of the resistor 7.5 divided by the duty cycle of the ON time of the gate 7.4. Since changing the resistance of the resistor in a resistor-capacitor filter changes the frequency response characteristics, changing the duty cycle of the flip flop 7.3 set time changes the frequency response of the whole circuit. Thus, one achieves a variable frequency filter by variable frequency gating techniques. In the particular configuration, the filter is a low-pass filter whose cutoff frequency is proportional to the frequency of the setting of the flip flop 7.3 and the pulse width of flip flop 7.3, which is controlled by the bandwidth control voltage 73.

As indicated in FIG. 7, additional gate-resistor-capacitor combinations may be connected in tandem to achieve a sharper frequency response above cutoff.

This particular type of filter is advantageous in connection with the analyzer system being described. It provides a simple method of increasing the frequency selectivity of the analysis system while retaining the basic constant-fractional-bandwidth properties of the basic analysis scheme.

Figure 8:
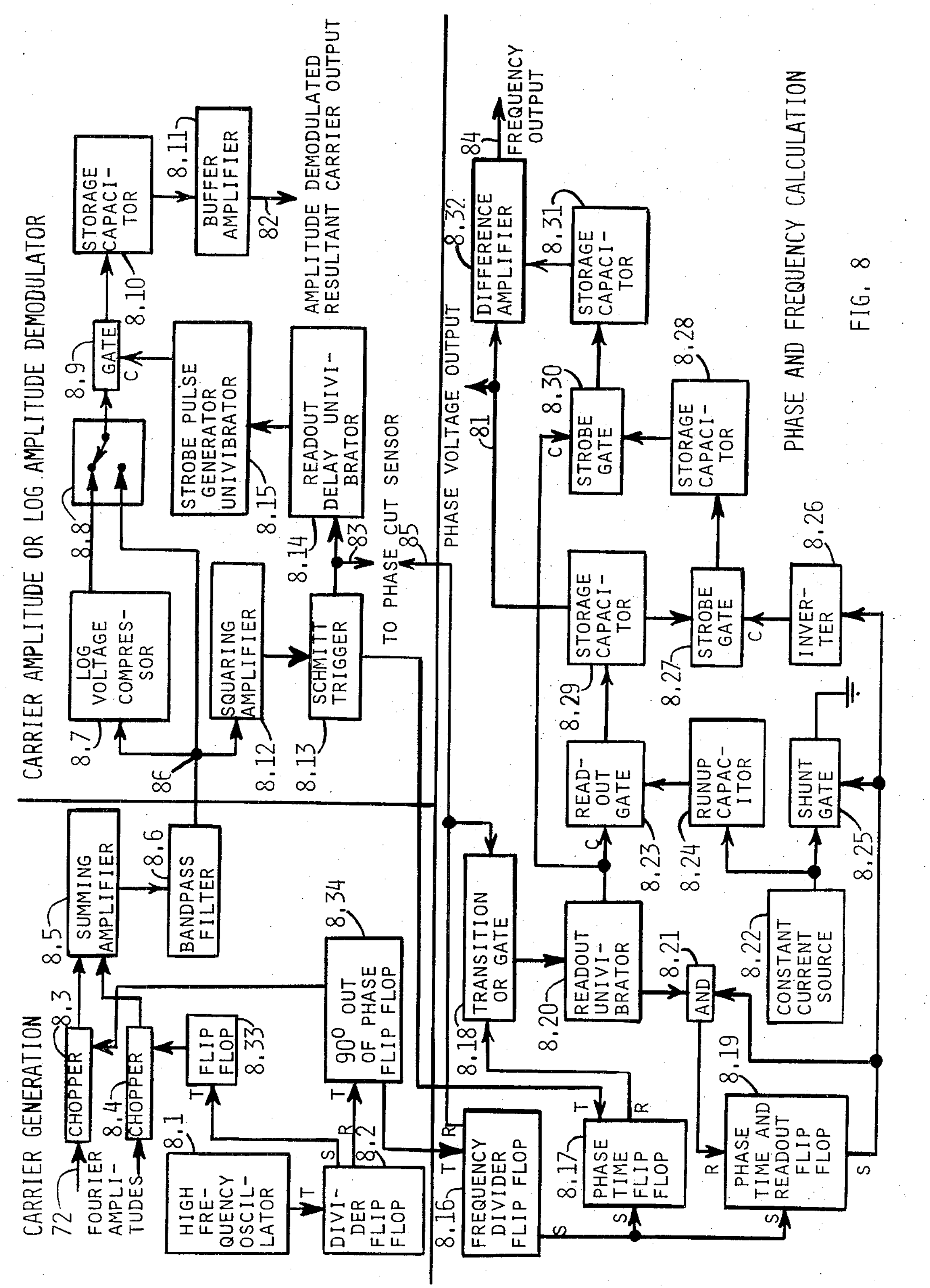
FIG. 8 is a block diagram of the output conversion circuitry for Fourier analysis.

FIG. 8 is a block diagram of the output converter. The primary function of this part of the analyzer is the conversion of the Fourier phazor component voltages 72 into a vector sum amplitude and phase voltages 82 and 81, respectively. In addition, differentiation of the phase signal with respect to time is performed, giving a voltage 84 proportional to the frequency difference of the analyzer ring shift register frequency 2.16 and the frequency of the Fourier component being analyzed in the input signal to the analyzer. In addition two control signal lines 83 and 85 are generated for use by the coherence detector shown in FIG. 2.

The conversion procedure is conveniently divided into three major steps. The first step in the conversion is the generation of a high frequency carrier signal whose amplitude and phase characteristics are identical to those of the Fourier component being analyzed in the input signal to the analyzer. It is assumed that this carrier signal frequency is much higher than the frequency of variation of the Fourier phazor components 72. In order to accomplish this carrier conversion, a stable high frequency oscillator 8.1, which may be the same as the oscillator 3.13, drives a frequency divider flip flop 8.2, which in turn drives the flip flops 8.33 and 8.34 in a toggling mode. The two flip-flops 8.33 and 8.34 are connected so that their output signals, which drive the choppers 8.3 and 8.4, are of the same frequency and 90° shifted in phase with respect to each other. The two flip flops 8.33 and 8.34 are toggled by by the set and reset outputs of flip flop 8.2. Since flip flops 8.33 and 9.34 are toggled by a transition in a particular direction, it takes two set or reset transitions for a full cycle of flip flop 8.33 or 8.34, or, in other words, two cycles of flip flop 8.2. Since a set transition on one output of flip flop 8.2 is followed by a reset transition on the other output of flip flop 8.2, in one half cycle of flip flop 8.2, the separation of these two transitions in time are one-fourths of a full cycle of flip flop 8.33 or 8.34, providing the 90° relative phase shift between flip flops 8.33 and 8.34.

The Fourier phazor components 72 are chopped by the choppers 8.3 and 8.4 which are driven by the flip flops 8.33 and 8.34. The output of each chopper goes to the summing amplifier 8.5 and consists of a signal that alternates between a reference potential (ground) and the input Fourier amplitude at the high frequency chopping rate. This chopping action generates the product of the two signals entering the chopper plus a contribution proportional to the signal being chopped, in this case, the Fourier amplitude. The chopping signal, being a square wave signal, may be considered to be the sum of the frequency component at the fundamental chopper frequency plus decreasing amplitude components at odd multiples of this frequency, according to Fourier series representation of repetitive waveforms. The multiplication action of the chopper 8.3 and 8.4 will then produce a sum of frequency components in the vicinity of the fundamental chopper frequency of flip flops 8.33 and 8.34 and higher odd multiples of this frequency. Near the frequency of each of these odd multiples will be the sidebands generated by the multiplication by the Fourier amplitude, which is presumed to vary slowly with respect to the fundamental frequency component of the carrier. All the aforementioned frequency components from both choppers are added together in the summing amplifier 8.5. The output of the summing amplifier 8.5 is filtered by the bandpass filter 8.6, the center frequency of which is that of the fundamental frequency of the chopper-drive flip flops 8.33 and 8.34. This filter thus retains only the sidebands in the vicinity of the fundamental chopping frequency and rejects those at the low frequency of the Fourier amplitudes themselves and the sidebands centered about the higher odd multiples of the chopping frequency. The signal 86 is then a high frequency signal whose phase, relative to that of flip flop 8.34, is that of the Fourier amplitudes 72, and whose instantaneous amplitude is equal to the vector sum of the Fourier phazor signals 72.

The second stage in the conversion process is the demodulation of the resultant carrier signal 86 and the generation of a trigger signal for the phase calculation. To accomplish these functions, the output of the bandpass filter 8.6 is applied to a squaring amplifier 8.12, a logarithmic voltage compressor 8.7, and the switch 8.8.

The squaring amplifier 8.12 is a high gain saturating amplifier that transforms the high frequency resultant carrier 86 into a square wave whose zero crossing times are the same as those of the resultant carrier 86. The output of the squaring amplifier 8.12 excites the Schmitt trigger 8.13 which generates a trigger signal whenever the output of the squaring amplifier 8.12 passes through zero in a given direction. The output of this Schmitt trigger 8.13 drives a univibrator 8.14, the coherence detector in FIG. 9 via line 83, and the phase calculation portion of the converter, where it excites the toggle input of the phase-time flip flop 8.17. The univibrator 8.14, which is triggered by the Schmitt trigger 8.13 at the zero crossing time of the resultant carrier signal 86, is ON for a time equal to one-fourth the period of the fixed-frequency, high frequency carrier signal. The univibrator 8.14 triggers a second univibrator 8.15 at the termination of its ON time. This second univibrator 8.15, whose ON time is very short compared with the period of the high frequency carrier signal, occurs approximately at the peak value of the high frequency of the carrier signal, which is approximately a sine wave whose peak value occurs one-fourths of its period after its zero crossing. This second univibrator 8.15 turns ON the gate 8.9 during the univibrator's short ON time. The output of switch 8.8, which selects either the resultant carrier 86 or the output of the logarithmic voltage compressor 8.7, is applied to the switched input of gate 8.9. Thus, switch 8.8 provides the option of selecting either the resultant carrier signal or its logarithm for subsequent demodulation. The gate 8.9 applies the output of the switch 8.8 to a storage capacitor 8.10. The peak carrier (or logarithm) potential is applied to the storage capacitor 8.10 for the short interval by the gate 8.9 and is retained until the next short ON time of the gating univibrator 8.15 occurs. Thus, the voltage appearing on the storage capacitor 8.10 is a sequence of potentials equal to the peak values of the resultant carrier or its logarithm, as selected by switch 8.8. Because this storage capacitor 8.10 must change its voltage during the very short interval during which the gate 8.9 is ON, the capacitance of this condenser 8.10 must be small. In order to prevent current drain of this capacitor 8.10 by subsequent circuits, the storage capacitor 8.10 output excites a buffer amplifier 8.11.

The Schmitt trigger 8.13 provides a trigger signal each time the resultant carrier passes through zero in a particular direction. The relative phase of the chopper drive flip flop 8.34 and the resultant carrier signal 86 will be proportional to the time difference between zero crossing times of the two signals. To calculate this time difference, the output of the Schmitt trigger drives the toggle input of the phase-time flip flop 8.17. The chopper drive flip flop 8.34 excites the toggle input of a frequency divider flip flop 8.16. This divider flip flop 8.16 initiates a phase-time calculation every other period of the resultant carrier 86. When the output of this divider flip flop 8.16 goes ON, it sets the two flip flops 8.17 and 8.19, the phase-time and the phase-time-plus-readout-time flip flops. The phase-time flip flop 8.17 stays in the set condition for the time between a zero crossing of the flip flop 8.34 and the Schmidtt trigger 8.13 signal, which occurs at a zero crossing of the resultant carrier. The reset output of the phase-time flip flop 8.17 and the reset of the divider flip flop 8.16 are applied to a transition OR gate 8.18, which triggers the univibrator 8.20 connected to its output whenever either of the flip flops 8.16 or 8.17 resets. This univibrator 8.20 pulse is short compared with the period of the flip-flop 8.34 chopper frequency and resets the phase-time-plus-readout-time flip flop 8.19 when this flip flop is in the set state, via the AND gate 8.21. The inputs to the AND gate 8.21 comprise the univibrator 8.20 output and the set output of the flip flop 8.19, the flip flop to whose reset input the output of the AND gate 8.21 is applied. Thus, no reset signal is applied to the flip flop 8.19 unless it is already in the set state. This gating of the reset signal via the AND gate 8.21 prevents pulse splitting type ambiguities in the flip flop 8.19 state when the set and reset inputs are simultaneously applied. The OR gate 8.18 is present so that in the case when the resultant carrier signal 86 is of insufficient amplitude to cause the Schmitt trigger 8.13 to be triggered, the readout univibrator 8.20 will be triggered by the reset line of the divider flip flop 8.16, instead of the reset output of the phase-time flip flop 8.17 as it is when the carrier is large enough to trigger the Schmitt trigger 8.13. This procedure keeps the magnitude of the phase signal potential on the runup capacitor 8.24 within normal limits when no signal is applied to the analyzer and the resultant carrier is zero.

It is noted that the phase-time flip flop 8.17 is set for the zero crossing time between the flip flop 8.34 and the resultant carrier 86. The set time of the flip flop 8.19 is this same interval plus the duration of the univibrator 8.20 ON state. The flip flop 8.19 is applied to a shunt gate 8.25, which is connected across a capacitor 8.24 to which is applied a constant current source 8.22. If the flip flop 8.19 is set, the shunt gate 8.25 is turned OFF, thereby allowing the current delivered by the constant current source 8.22 to flow to the capacitor 8.24, instead of to ground through the shunt gate 8.25, as the current does when the shunt gate 8.25 is ON. The potential across the capacitor 8.24 increases linearly with time, and at the instant the readout univibrator 8.20 is triggered, the capacitor has reached a potential proportional to the time the phase-time flip flop is in the set condition. This readout univibrator 8.20 turns ON the readout gate 8.23 to whose input is connected the runup capacitor 8.24. The output of the readout gate 8.23 drives a storage capacitor 8.29 whose capacitance is much smaller than that of the runup capacitor 8.24. The potential across the runup capacitor 8.24 is read into the storage capacitor 8.29 when the readout univibrator 8.20 is turned ON. Capacitor 8.29 holds the voltage until the next time the univibrator 8.20 is turned ON at which time a new potential may be acquired. The termination transition of the pulse from the univibrator 8.20 resets the flip flop 8.19 via the AND gate 8.21. The flip flop 8.19 turns ON the shunt gate, resetting the runup capacitor 8.24 and preparing for another runup-readout sequence. The set output of flip flop 8.19, which controls the shunt gate 8.25, is also applied to an inverter 8.26, which drives a secondary strobing gate 8.27. This secondary strobe gate 8.27 is turned ON when the shunt gate in ON and the storage-capacitor voltage 8.29 is quiescent. This secondary strobe gate 8.27 reads the voltage across the storage capacitor 8.29 into the secondary storage capacitor 8.28. Now the readout univibrator 8.20, which controls the first readout gate 8.23, also drives a third strobe gate 8.30, whose input comes from the secondary storage capacitor 8.28. Just prior to the triggering of the readout univibrator 8.20, the first and second storage capacitors 8.29 and 8.28 will have common potentials. When the readout univibrator 8.20 is triggered ON, a new potential will be read into storage capacitor 8.29, while the previous value currently stored on the second storage capacitor 8.28 will be read into the third storage capacitor 8.31. Thus, one has two successive peak values of the runup capacitor stored on the two storage capacitors 8.29 and 8.28. These peak values are proportional to the time between zero crossings of the chopper flip flop 8.34 and the resultant carrier 86, and, therefore, are proportional to their relative phase. As pointed out previously, this relative phase is the phase represented by the Fourier amplitudes 72 applied to the converter.

The two successive values of the phase value at the two storage capacitors 8.29 and 8.31 are applied to a difference amplifier 8.32, which produces an output voltage prroportional to the difference of the input signals. Since, in this case, the two inputs from the storage capacitors 8.29 and 8.31 are time displaced versions of the same signal, the output of the difference amplifier 8.32 is approximately proportional to the frequency of the Fourier amplitudes 72, whose frequencies are in turn equal to the difference of the frequency of the analyzer and the frequency of the input signal. This frequency-proportional output goes to the coherence detector via line 84.

Figure 9:
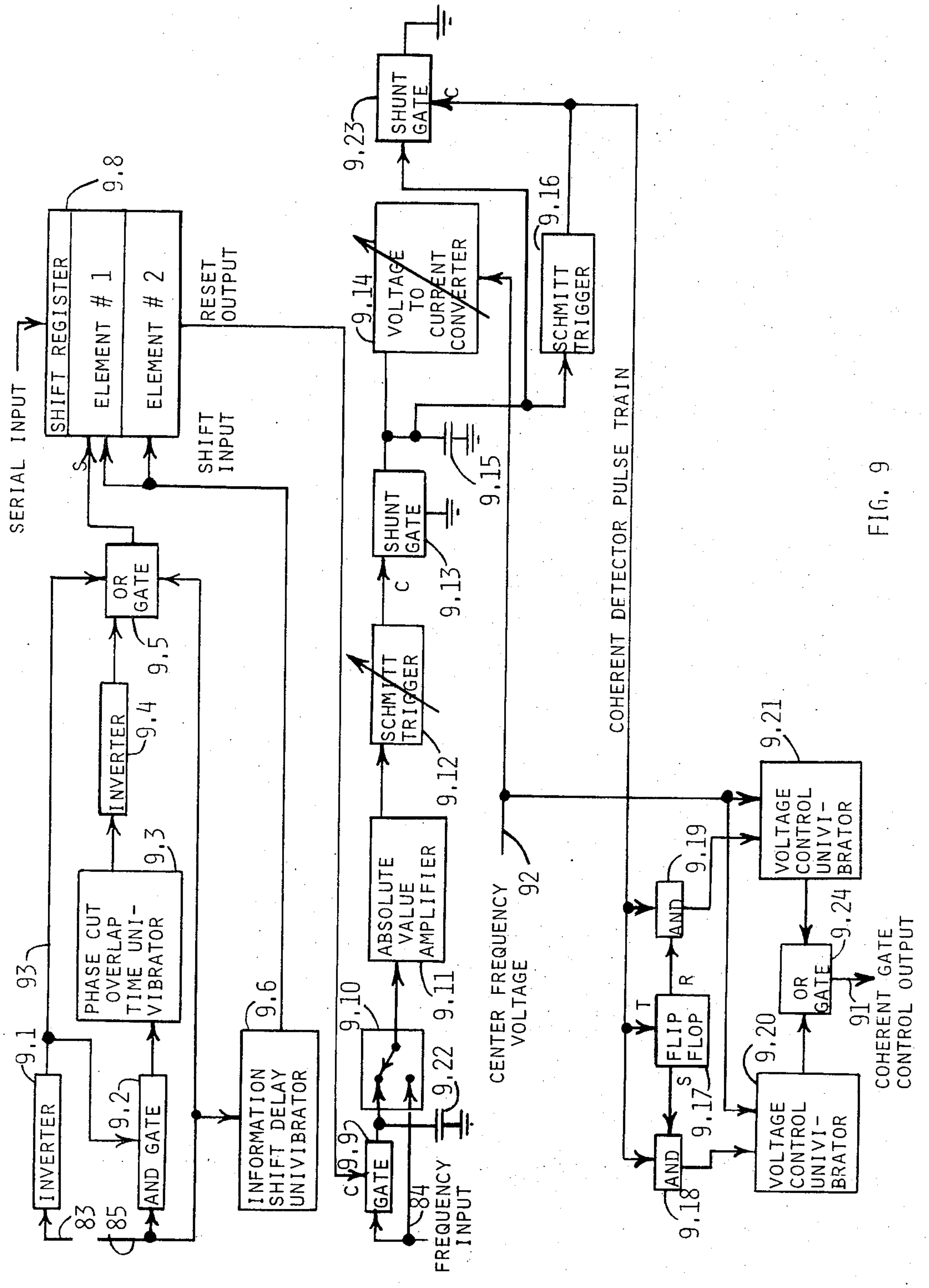
FIG. 9 is a block diagram of the coherence detector.

FIG. 9 is a block diagram of the coherence detector 2.26. The coherence detector provides an output signal whenever there appears to be a signal at the input to the analyzer with coherent signal energy of a frequency near the frequency of the Fourier component being computed by the analyzer. Basically, it is determined whether or not the absolute value of the frequency signal 84 computed by the converter shown in FIG. 8 is less than a preset value for a prescribed interval of time. If the input signal to the analyzer consists entirely of noise, the phase output of the analyzer will also be noisy. That is, its value will change rapidly and unpredictably. The frequency output 84, which is the derivative of this phase, will vary then even more rapidly and erratically. The absolute value of the frequency 84 will then not be a smooth function. If, however, the analyzer signal input contains a component of relatively constant frequency near the analysis frequency, the phase output will be a smooth function of time, increasing or decreasing in a relatively smooth manner, or remaining constant. In this case, the temporal derivative of the phase function will be small. A preset voltage and a prescribed time interval may be chosen so that, when noise is present, the absolute value of the frequency signal exceeds the preset value during the prescribed time interval, yet, when the coherent signal appears, the preset voltage will not be exceeded for the prescribed time interval, and, thus, the circuit will assert the presence of a coherent signal component.

To accomplish the above, the frequency input 84 drives the gate 9.9 and also a switch 9.10. The gate 9.9 is controlled by the reset output of the second stage of a shift register 9.8, which is the final stage of the phase-cut sensor circuitry.

The phase-cut sensor circuitry comprises the inverter 9.1, the AND gate 9.2, the univibrator 9.3, the inverter 9.4, the OR gate 9.5, the univibrator 9.6, and the two stage shift register 9.8. The inputs 83 and 85 to this circuitry are the Schmitt trigger 8.13, driven by the resultant carrier signal 86, and the divider flip flop 8.16. The phase-cut circuitry generates a pulse that occurs for each phase value computed whenever the phase function is within about 3° of the cut. This pulse is generated by determining if there is an overlap between a univibrator 9.3 pulse triggered by either the zero crossing of the resultant carrier signal 86 or the divider flip flop 8.16, that initiates the phase calculation, and to which the phase of the resultant carrier signal 86 is referred. The univibrator 9.3 is trailing edge triggered, i.e., the univibrator 9.3 is turned ON by the transition of the AND gate 9.2 from the ON to the OFF state.

The duration of the univibrator 9.3 pulse corresponds to the 3° window of the phase-cut sensor circuitry. A signal is created in the output of the cut sensor if and only if both signals from flip flop 8.16 and the Schmitt trigger 8.13 are originally ON and both go OFF during the time the univibrator 9.3 is ON. This goal is accomplished as follows: The univibrator 9.3 is turned ON if and only if both signals applied to AND gate 9.2 are originally ON and one or the other is turned OFF. That there be any transition of the OR gate 9.5 to the OFF state requires that the original input signals 85 and 83 be OFF and ON, respectively, sometime during the time the univibrator 9.3 is ON. Since the univibrator 9.3 is triggered ON only if one of the AND gate 9.2 inputs was ON and the other, originally ON, goes OFF, the OR gate 9.5 then requires that both input signals to the AND gate 92 turn OFF during the width of the univibrator 9.3 pulse. Since the phase is reckoned essentially as the time difference between a transition of the divider flip flop 8.16 and a transition of the Schmitt trigger 8.13, there will be an output from the OR gate 9.5 if and only if the magnitude of this time difference is smaller than the width of the univibrator 9.3 pulse. The output of the OR gate 9.5 is applied to the set input of the first stage of a shift register 9.8. Whenever the OR gate 9.5 goes through a transition, the first flip flop in the shift register 9.8 goes to the set state.

A univibrator 9.6, triggered by the divider flip flop 8.16 via line 85, activates the shift line of the shift register 9.8. The duration of the univibrator 9.6 pulse is such that if any phase-cut sensor transition of the OR gate 9.5 occurs, the termination of the univibrator 9.6 pulse occurs about halfway between successive phase-cut sensor OR gate 9.5 transitions. If no transition of the OR gate 9.5 occurs between successive shift transitions of the univibrator 9.6 pulses, a reset condition is shifted into the second shift register, since zero (a reset condition) is shifted into the first unit of shift register 9.8 without any intervening OR gate 9.5 transitions. The reset condition continues to be shifted into the second unit of shift register 9.8 until a transition of the OR gate 9.5 occurs. The OR gate 9.5 transition sets the first unit of the shift register 9.8, which, at the time of the next shift signal, shifts the set condition into the second unit. If another OR gate 9.5 transition occurs before the next shift signal, which will happen if the phase has remained within the 3° phase-cut sensor window, since the previous one, the first unit of the shift register 9.8 will be set again. When the next shift signal occurs, the set condition will again be shifted into the second unit. As long as the phase signal stays within the 3° phase-cut sensing window, the set state will continue to be shifted into the second unit of the shift register 9.8. The second unit of the shift register 9.8 will be reset most of the time (during which the phase signal is not within 3° of the cut) and thus the gate 9.9, which switches the frequency signal 84 will be ON, except when the phase signal is near the cut. The frequency signal is gated because, when the phase signal goes through the cut, the phase function has an abrupt jump in value and a large transient results in the derivative of the phase function. This transient is really an anomally of the method of driving the frequency signal 84 and, therefore, should not be used by the remainder of the coherence detector. In order to remove this phase-cut transient, the gate 9.9 is turned OFF whenever the phase is in the vicinity of the cut. The previous value of the frequency signal 84 is stored by the capacitor 9.22, until the gate 9.9 is turned ON by the movement of the phase signal away from the cut. Capacitance of 9.22 was 0.01 ufd in the instrument constructed.

Either the direct or gated frequency signal are selected by the switch 9.10. The output of switch 9.11 goes to the absolute value amplifier 9.11 whose output is proportional to the absolute value of the frequency signal 84 or its gated version. The output of the absolute value amplifier 9.11 drives the variable threshold Schmitt trigger 9.12. The Schmitt trigger controls a shunt gate 9.13, which is connected across a runup capacitor 9.15 to ground. Also connected to this runup capacitor are a voltage-to-current converter 9.14, a Schmitt trigger 9.16, and a second shunt gate 9.23 controlled by the Schmitt trigger 9.16. If the voltage on the runup capacitor 9.15 is below a certain value, the Schmitt trigger 9.16 output is OFF and the shunt gate 9.23 is OFF. The capacitance of the condenser 9.15 used in the instrument constructed was 0.1 ufd. If the absolute value amplifier 9.11 output does not trigger the Schmitt trigger 9.12, the shunt gate 9.13 stays OFF allowing the current delivered by the voltage-to-current converter 9.14 to flow to the runup capacitor 9.15, rather than through the shunt gate 9.13. The voltage across the runup capacitor 9.15 increases linearly with time, the rate being dependent upon the manual setting of the conversion ratio of the voltage-to-current converter 9.14 and the magnitude of the voltage 92 applied to the converter 9.14. The voltage 92 is a potential proportional to the center frequency of the analyzer determined by the voltage-controlled oscillator 2.22. Eventually, the voltage across the capacitor 9.15 trips the Schmitt trigger 9.16. The Schmitt trigger output turns ON the shunt gate 9.23 across the capacitor 9.15, which resets the capacitor 9.15 voltage to ground and in the process the Schmitt trigger 9.16 turns OFF again. Thus, the Schmitt trigger 9.16 stays ON just long enough to turn itself OFF by resetting the capacitor voltage.

If now the Schmitt trigger 9.12 continues to stay OFF, the runup capacitor 9.15 will continue the cycling described above, producing pulses in the Schmitt trigger 9.16 output at regular intervals. The remainder of the circuitry converts this pulse train into a constant level output, so that if n pulses from the Schmitt trigger 9.16 occurs in sequence, a gate signal that stays ON for the duration of the n signals will occur. However, the tripping of the Schmitt trigger 9.12 means that the frequency signal has become "noisy." If the Schmitt trigger 9.12 continues to fire before the runup capacitor 9.15 voltage can increase to a sufficient value to fire the Schmitt trigger 9.16, the Schmitt trigger 9.16 output is quiescent.

The output of Schmitt trigger 9.16 goes to the toggle input of a flip flop 9.17 and to two AND gates 9.18 and 9.19. Consider the case where the Schmitt trigger 9.16 is producing a series of pulses due to the application of a coherent signal at the analyzer input. The spacing of these pulses will be proportional to the voltage 92. The pulse train from the output of Schmitt trigger 9.16 will cause the flip flop 9.17 to alternate between the set and reset states and turns on alternately the AND gates 9.18 and 9.19. The output of the Schmitt trigger 9.16 is also applied to the two AND gates 9.18 and 9.19, which in turn drive the voltage-controlled univibrators 9.20 and 9.21, respectively. When a pulse train is generated by the Schmitt trigger 9.16, the two voltage-controlled univibrators are triggered by alternate Schmitt trigger 9.16 pulses via the AND gates 9.18 and 9.19. The durations of the univibrators 9.20 and 9.21 ON states are equal and inversely proportional to the control voltage 92. The voltage control of the univibrator duration can be accomplished in several ways, one of which is the application of the control voltage 92 to the resistor which, in connection with the hold-off capacitor in a standard monostable multivibrator circuit, determines the circuit time constant controlling the duration of the univibrator ON state. As the control voltage increases, the current flowing to the capacitor increases, which charges the hold-off capacitor through the required voltage range in a shorter time giving an output pulse of shorter duration. The frequency of output pulses from the univibrators 9.20 and 9.21 is proportional to the voltage 92 as a result of the action of the voltage-to-current converter 9.14. The constant of proportionality between the voltage 92 and the common durations (period) of the univibrators 9.20 and 9.21 pulses are such that this period is slightly longer than the period of the repetition of the pulse train assumed to be emanating from the Schmitt trigger 9.16. The outputs of the two univibrators 9.20 and 9.21 are ORed together in the OR gate 9.24. If a continuous pulse train (two or more successive pulses) is produced by the Schmitt trigger 9.16, the output of the OR gate stays ON continuously until one or more pulses are missing from this pulse train.

The voltage signal 92 is proportional to the center frequency of the voltage-controlled oscillator 2.22, which is assumed to be providing the analyzer frequency control signal via switch 2.29. As the voltage 92 is increased, the voltage-controlled oscillator 2.22 frequency increases increasing the analysis frequency. In order to determine the presence of a coherent component in a signal, one must examine the signal for a sufficient time to determine whether the waveform contains some repetitive part. In order to determine whether or not there is some degree of repetition, one must examine the signal for a time at least as long as is required for the repetition to occur, and normally somewhat longer, i.e., for several periods of the expected approximate repetition rate. The coherence detector is more useful the shorter the time required for it to detect the presence of coherence in the analyzer input. However, as indicated above, there is a minimum time required at any particular frequency. This time decreases as the frequency of the region where coherence is sought is increased. This is true because more repetitions (or cycles) per unit time occur as the frequency increases. Thus, as the analyzer frequency is increased by increasing the voltage 92 via the voltage-controlled oscillator 2.22, the runup rate of the capacitor 9.15 is increased, requiring a shorter time to trip the Schmitt trigger 9.16 and thereby assert the presence of a coherent signal in the analyzer input 1. The pulse rate generated by the Schmitt trigger 9.16 will, therefore, be greater and the duration of the smoothing univibrators 9.20 and 9.21 pulse will be shortened proportionally by the connection of the voltage 92 to these univibrators.

Figure 10:
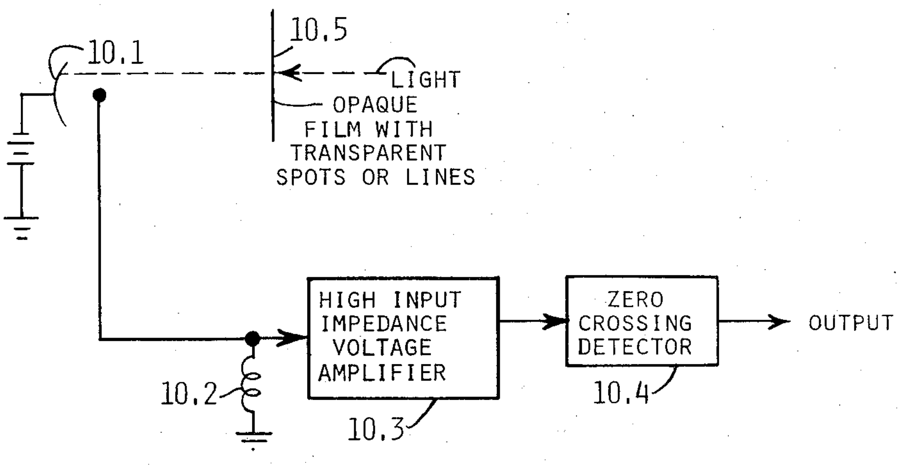
FIG. 10 is a diagram of the photodetector amplifier circuits.

FIG. 10 is a circuit diagram of the photodetector amplifier system, which may be the same as the photodetector system 1.12 or the photodetector 3.3 plus the amplifier 3.4. These circuits generate a signal precisely at the instant the temporal derivative of the intensity of the light beam is zero and the intensity of the light signal is not zero. If a cathode-ray-tube spot is focused on a medium 10.5 on which there are transparent regions, such as spots or lines, comparable in size to the focused spot, and if the spot is scanned across one of these transparent regions, the light intensity transmitted through the medium 10.5 will increase to a maximum. This condition occurs when the scanning spot is precisely centered on the transparent region along the scanning axis direction. The intensity will then decrease as the spot moves away from the transparent region. At the instant when the spot is centered on the transparent region, the rate of change of the light intensity with respect to time will be zero.

The photodetector 10.1 detects the light signal transmitted through the transparent medium 10.5, which may be the same as the film 1.8 or 3.2, and produces a current proportional to the light intensity incident upon it. The photodetector could be a photomultiplier, a vacuum or gas phototube, or a solid state photodetector. In most photodetectors commonly used, the current delivered to the output can be made relatively independent of voltage changes at the output by proper biasing of the operating point relative to other parts of the photodetector. The current delivered by the photodetector 10.1 flows through the inductor 10.2 to ground. The inductor 10.2, whose inductance was equal to 2 mh in the instrument constructed, is connected to a very high input impedance, voltage amplifier 10.3. Because of the very high input resistance of the amplifier 10.3 essentially all the current delivered by the photodetector flows through the inductor. As is well known, the voltage across the inductor 10.2 (if it is an ideal inductor with zero resistance) will be proportional to its inductance and to the derivative (rate of change) with respect to time of the current flowing through this inductor. Thus, the voltage at the input to the high input impedance amplifier 10.3 will be proportional to the rate of change of the light intensity with respect to time. The output of the amplifier 10.3 drives a zero crossing detector 10.4, which produces a rapid transition when its input signal passes through zero. The inductor 10.2, amplifier 10.3, and the detector 10.4 comprise a specific example of the photo-detector amplifier 3.4.

As noted previously, at the instant the light spot focused on the medium 10.5 is centered on a transparent spot or line as the spot scans across the medium, the derivative of the light signal will be zero. This is precisely the time the zero crossing detector will produce an output signal, which is the signal desired. The zero crossing detector may be a Schmitt trigger circuit set to trip at zero voltage, or it may be a very high gain, high frequency, linear amplifier that swings rapidly between output saturation levels as the input signal changes only slightly about the zero voltage level. This second circuit is commonly called a voltage comparator amplifier.

Figure 11:
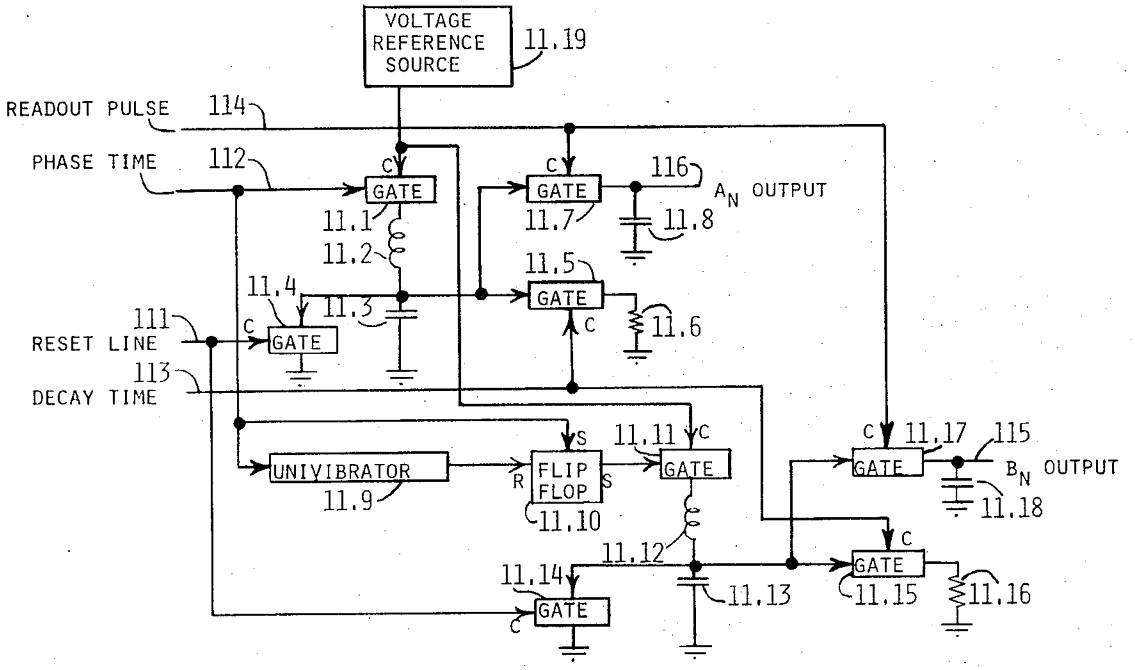
FIG. 11 is a schematic and block diagram of the synthesizer, Fourier deconversion circuits.

FIG. 11 is a schematic and block diagram of the synthesizer Fourier deconversion circuits. These circuits are used in the synthesizer to convert the phase-time flip flop 3.22 duration and the logarithm of the amplitude flip flop 3.23 duration into the corresponding Fourier phazor components. These flip-flop times are generated by the scanning circuits shown in FIG. 3 and occur in sequence as the various curves are scanned.

The deconversion takes place in four time intervals, which are called the reset, ring, decay, and readout intervals for convenience. These intervals correspond to the activation of the input lines 111, 112, 113, and 114, respectively. During the reset interval, the reset line 111 is ON and all other inputs 112, 113, and 114 are OFF. The reset line 111 when turned ON turns ON the shunt gates 11.4 and 11.14, which in turn shunt the capacitors 11.3 and 11.13 to ground.

During the ring interval, the phase-time line 112 is turned ON and lines 111, 113, and 114 are turned OFF. The ON signal on the phase-time line 112 turns the gate 11.1 ON and sets the flip-flop 11.10, which in turn turns the gate 11.11 ON. The gates 11.1 and 11.11 apply a reference potential to the two pairs of series connected inductor and capacitors 11.2 and 11.3, and 11.12 and 11.13. When the reference potential is applied, the resonant LC circuits begin to oscillate. These two resonant circuits act as function generators, for when the gates 11.1 and 11.11 are opened, the capacitors 11.3 and 11.13 are left with voltages on them given by the expressions $$V_1 = V_0 \cos(a_1 t_1). \quad (11.1)$$

$$V_2 = V_0 \cos(a_2 t_2), \quad (11.2)$$

where $V_1$ and $V_2$ are the voltages on the two capacitors 11.3 and 11.13, $V_0$ is the reference potential, $a_1$ and $a_2$ are constants depending upon the inductors 11.2 and 11.12, and the capacitors 11.3 and 11.13, and the times $t_1$ and $t_2$ are the times for which the gates 11.1 and 11.11 are turned ON. When the phase-time signal 112 goes OFF, the gate 11.1 is opened and the univibrator 11.9 is turned ON. This univibrator 11.9 stays ON for a duration of time corresponding to 90° of phase of the ringing period of the resonant circuit comprising the inductor 11.12 and the capacitor 11.13. When this univibrator 11.9 turns OFF, it resets the flip flop 11.10, which turns OFF the gate 11.11. Since the time for which the gate 11.11 is ON corresponds to 90° of phase greater than the time the gate 11.1 is ON, we have $$V_1 = V_0 \cos(a_1 t_1), \quad (11.3)$$

$$V_2 = V_0 \sin(a_2 t_1). \quad (11.4)$$

During the decay interval, the decay-time line 113 is ON and the other input lines 111, 112, and 114 are OFF. The ON condition of the decay-time line 113 turns the gates 11.5 and 11.15 ON, which allow current to flow from the capacitors to ground through the decay resistors 11.6 and 11.16. As is well known, the rate of decay of the potential across the capacitors 11.3 and 11.13 will, be exponential, thereby providing an antilogarithmic multiplication of the signal appearing on the capacitors just prior to the decay interval. Values of the inductor 11.2, the capacitor 11.3, and the resistor 11.6 used in the instrument constructed were 3 mh, 0.01 ufd, and 2,000 ohms, respectively.

During the fourth interval, the readout interval, the readout-pulse line 114 is turned ON while the other remaining input lines 111, 112, and 113 are OFF. The ON condition of the readout pulse line turns ON the gates 11.7 and 11.17. These gates transfer the voltages appearing on the ringing capacitors 11.3 and 11.13 to the holding capacitors 11.8 and 11.18, which are much smaller in capacitance than the capacitors 11.3 and 11.13. This strobing of the capacitor 11.3 and 11.13 voltages into the holding capacitors 11.8 and 11.18 allows the deconversion cycle to start again with the reset cycle immediately after the readout pulse for processing of sequential information generated by the cathode-ray-tube scanning circuits.

Figure 12:
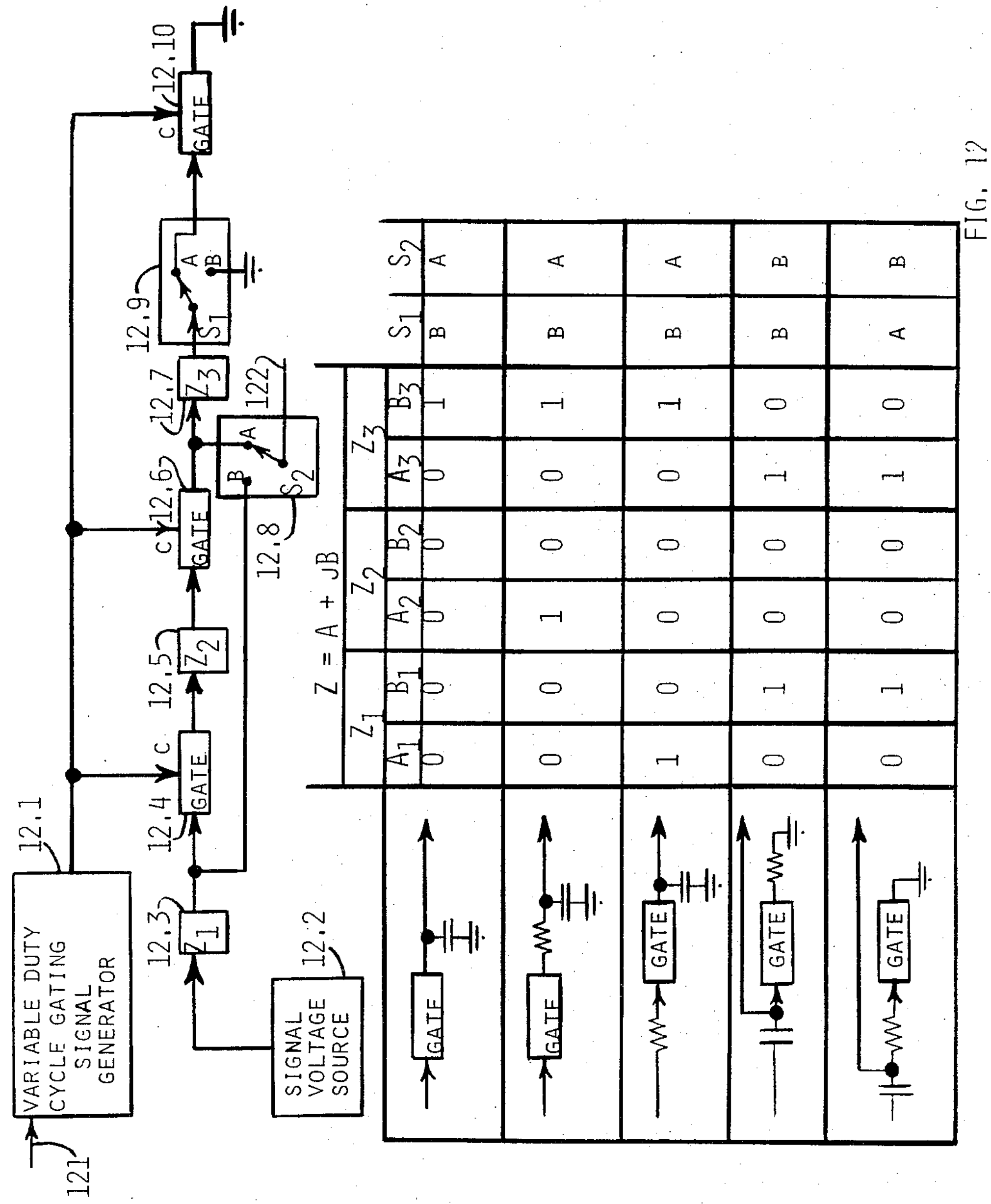
FIG. 12 is a block diagram of a generalized, variable-duty-cycle time-sampling filter.

FIG. 12 is a block diagram of a generalized variable-duty-cycle time-sampling filter. This circuit may be used to implement either a low-pass or a high-pass resistor-capacitor filter. A voltage signal source 12.2 is applied to series impedance element 12.3 whose output is connected to a gate 12.4 and an input terminal of switch 12.8. The output of gate 12.4 is connected to a second series impedance element 12.5 whose output is applied to a second gate 12.6. The output of gate 12.6 is connected to the second input terminal of the switch 12.8 and a third series impedance element 12.7. The output of impedance 12.7 is connected to the common terminal of a second switch 12.9. This common terminal of switch 12.9 is switched either to ground or the input of a gate 12.10.

The three gates 12.4, 12.6, and 12.10 are controlled by a variable-duty-cycle generator 12.1. By variation of the duty cycle of the pulse generator 12.1 via line 121, one may alter the effective impedance of the impedance elements connected to the gates, as explained in connection with FIG. 7. Thus, the frequency response characteristics of the circuit may be altered by variation of the duty cycle of the pulse generator 12.1.

The table of FIG. 12 gives the positions of switches 12.8 and 12.9, and the types of impedance elements to be used to achieve various types of filters shown.

Figure 13:
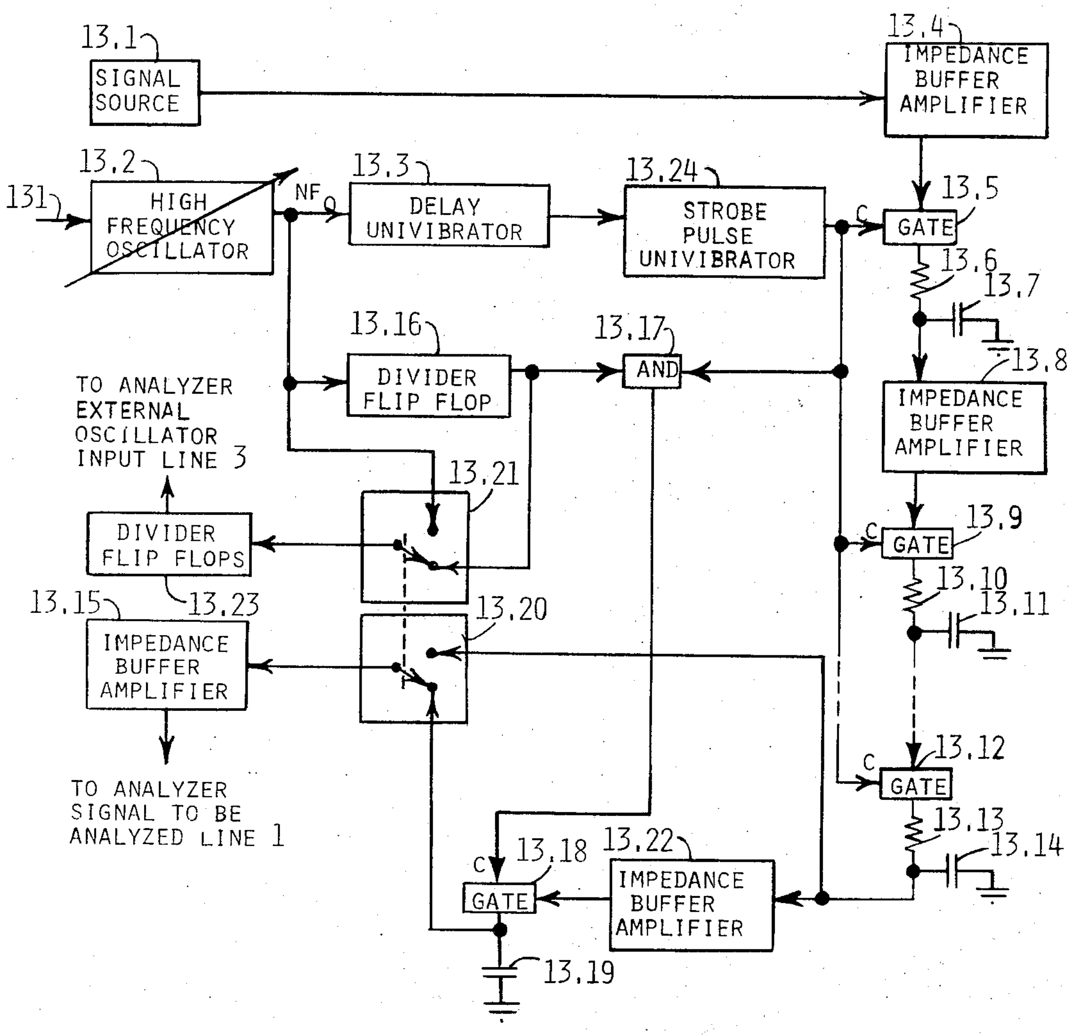
FIG. 13 is a block and schematic diagram of a signal preprocessor for the analysis system.

FIG. 13.1 is a block and schematic diagram of a signal preprocessor for the analysis system. The purpose of this preprocessor is three-fold. First, it samples the input signal and holds the value while the sampling gates 2.7 and 2.8 in the analyzer are reading the signal to be analyzed on line 1 and its inverse into the storage capacitors 2.9 and 2.10. This prevents the appearance of signal-to-be-analyzed voltage changes appearing on the capacitors 2.9 and 2.10 while the gates 2.7 and 2.8 are ON and in turn prevents these changes appearing at the outputs of the matrices 2.13 and 2.14. Second, holding constant the voltages applied to the capacitors 2.9 and 2.10, while the corresponding gates 2.7 and 2.8 are ON, results in an effective load reduction on the inputs to the gates 2.7 and 2.8 by the capacitors 2.9 and 2.10, giving better tracking accuracy of the voltages on the capacitors 2.9 and 2.10 when the voltage signal lines entering the gates 2.7 and 2.8 are connected to a source of nonzero impedance. The sampling gates 2.7 and 2.8 have a fixed minimum ON resistance R. Only one method is available to effectively decrease tracking errors due to the R-C time constant (where C is the capacitance of each of the storage capacitors 2.9 and 2.10. This is to hold the voltages applied to the gates 2.7 and 2.8 constant while they are applied to the capacitors 2.9 and 2.10. Tracking errors of the capacitors 2.9 and 2.10 during the interval a voltage is applied would be greater in some cases if the signal were allowed to change during this interval. By using high input-impedance, low output-impedance amplifiers 13.4, 13.8, 13.22, and 13.15 in connection with capacitors 13.7, 13.11, 13.14, and 13.19, which are all much smaller than the storage capacitors 2.9 and 2.10, one can achieve essentially errorless tracking of the capacitors 13.7, 13.11, 13.14, and 13.19. The resistors 13.6, 13.10, and 13.13 produce the desired low-pass filtering action by introducing a controlled smoothing of the tracking of the capacitors 13.7, 13.11, and 13.14 for all the time samples. (In contrast, the resistances of the gates 2.7 and 2.8 can not be accurately controlled inexpensively to produce uniform smoothing of the tracking of the storage capacitor 2.9 and 2.10 potentials. Further, each of the gates 2.7 and 2.8 sees only a time sampled part of the signal and not the complete sequence of time samples of the signal. Consequently, the resistances of each of the gates 2.7 and 2.8 together with their respective condensers 2.9 and 2.10 can not provide a gated, low-pass filtering action of the input. The filtering action of the resistance of the gates 2.7 and 2.8, and the capacitors 2.9 and 2.10 is equivalent to filtering the relatively slowly varying matrix outputs, instead of the input signal being analyzed. The slowly varying nature of the matrix outputs results basically from the integration of the waveform over one full shift register 2.16 cycle.) Third, the gating of the input signal by techniques discussed in connection with FIG. 12 provides the opportunity of low-pass, variable-frequency filtering of the input signal. This filtering can be very important because the analyzer is incapable of distinguishing a particular Fourier component from its frequency folded counterpart, where the frequency folding takes place about the shift register 2.16 shift frequency. This frequency folding occurs as a direct result of the sampling procedure and may be understood by noting that, given a particular sampling rates, there are a number of different frequency sinusoids that may be applied to the sampling procedure that will produce the same set of sampled values. An obvious case is the situation where one samples at the rate F the peak values only of a sinusoid of frequency F. If one now samples a sinusoid of equal amplitude of frequency 2F at the frequency F in a manner identical to the original sampling one will acquire an identical set of sampled values, even though the frequency of the waveform has been doubled. The variable frequency filtering may be used to remove the "folded" frequency components before sampling by the gates 2.7 and 2.8 occurs, preventing interference in the measurement of a particular Fourier frequency component by its "folded" counterpart.

Since the variable frequency filtering employs sampling of the input waveform, the sampling rate must be high enough to pass the highest frequency components one desires to be passed by the filter. The minimum sampling frequency of a signal to pass a frequency component of frequency $F_o$ is $2F_o$. However, if one uses a sampling frequency slightly less or equal to twice the desired maximum frequency to be passed, the sampling procedure does not distinguish strongly between the frequencies close to the maximum frequency passed and their "folded" counterparts, the "folding" occurring about the sampling frequency passed and at a rate twice the desired maximum frequency to be passed. Therefore, one should use a higher sampling rate than the factor of two permitted by the sampling theorem to allow discrimination between various frequency folded components that may be present in the input signal.

To accomplish the sampling and variable frequency filtering, signal source 13.1 is applied to a gate 13.5 via a low output-impedance amplifier 13.4. A voltage-controlled, high frequency oscillator 13.2 excites a delay univibrator 13.3 and a frequency divider flip flop 13.16. The delay univibrator 13.3 triggers a second univibrator 13.24 at its termination. The output of the frequency divider flip flop 13.16 is connected to one input terminal of a switch 13.21, the other input of switch 13.21 being connected to the output of the high frequency oscillator 13.2. Univibrator 13.24 controls one or more gates 13.5, 13.9, and 13.12. The output of the first gate 13.5 is connected to a resistor 13.6 and the capacitor 13.7, which form a low-pass filter. Capacitor 13.7 also acts as a storage capacitor holding the most recent voltage applied to it. The capacitor 13.7 voltage is applied to a high input, low output impedance amplifier 13.8, whose output is connected to a second gate 13.9, resistor 13.10, and capacitor 13.11. An indefinite number of impedance-amplifier, gate, resistor, capacitor sections may be cascaded to give as sharp a low-pass filter response as desired.

By changing the frequency of the oscillator 13.2 one simultaneously changes the analyzer frequency and the frequency response characteristics of the filtering action. By appropriate choice of the resistor 13.6 and the capacitor 13.7 one may eliminate the "foldover" frequency components. In the instrument constructed, the resistor 13.6 is 1,000 ohms and the capacitor 13.7 is 3000 pf. The output of the final resistor 13.13 and capacitor 13.14 junction is connected to one input terminal of switch 13.20 and to a gate 13.18 via the buffer amplifier 13.22. The gate 13.18 is controlled by the AND gate 13.17 whose inputs are the strobe pulse univibrator and the frequency divider flip flop 13.16. The ANDing of the univibrator 13.24 pulse by the AND gate 13.17 results in gate 13.18 being turned ON at a rate equal to half that of the gate 13.12 and equal to the frequency of the flip flop 13.16. Gate 13.18 causes every other voltage step occurring on capacitor 13.14 to be stored on capacitor 13.19. The voltage appearing on capacitor 13.19 is connected to the second input terminal of switch 13.20. The voltage appearing on the capacitor 13.19 is applied to the input signal to be analyzed line 1 in FIG. 2 via the impedance buffer amplifier 13.15. The number of divider flip flops 13.23 in cascade is such that a new voltage sample is stored on the storage capacitors 2.9 and 2.10 each time a new voltage signal appears on the storage capacitor 13.19. This is accomplished by controlling shift register 2.16 with the divider 13.23 output (via the univibrator 2.30, the external oscillator input line 3, and switch 2.29). The frequency of excitation may be phase controlled for system frequency tracking by voltage control of the oscillator 13.2 frequency. This is accomplished by connecting the output of the high gain amplifier 2.31 to the voltage control line 131 of the oscillator 13.2. This permits frequency tracking in the usual manner. By sampling the input signal source 13.1 with gates 13.5, 13.9, and 13.12 at a rate greater than the acquisition of new voltage samples on the storage capacitors 2.9 and 2.10, one may achieve effective filtering without introduction of folded frequency components up to the maximum frequency capable of being analyzed with any given sampling rate by the gates 2.7 and 2.8. The gate 13.18 provides a constant signal to the analyzer input on line 1, FIG. 2, during the ON time of any particular gate 2.7 or 2.8.

If the coupled switches 13.21 and 13.20 are changed from the position shown, the divider 13.16 is bypassed for shift register 2.16 control, and the input to the analyzer now originates from the voltage samples stored on the final filter capacitor 13.14 via the switch 13.20 and the buffer amplifier 13.15. In this second switch position, the high frequency clock runs at half the frequency it does when the switch is as originally shown. In this mode the divider flip flop 13.16, the AND gate 13.17, the gate 13.18, and the buffer amplifier 13.22 are not used. With switches 13.20 and 13.21 in this position the sampling rate of gates 13.5, 13.9, and 13.12 compared with the sampling rate of the gates 2.7 and 2.8 is only half that compared with the situation with switches 13.20 and 13.21 in the original position shown in FIG. 13. This permits only half the maximum cutoff frequency achievable with the switches 13.20 and 13.21 in the original position and the use of the additional gating provided by the gate 13.18.

Figure 14:
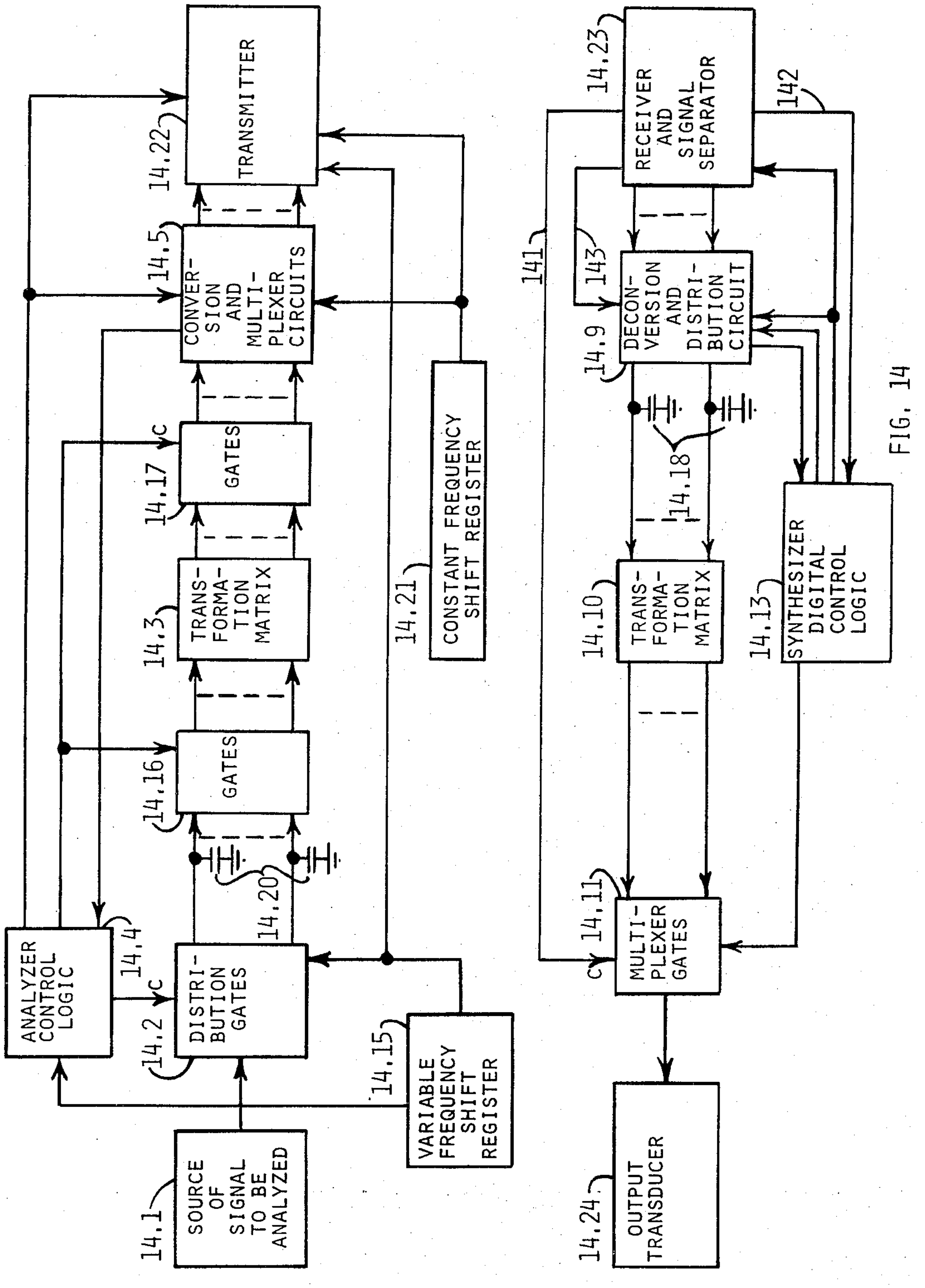
FIG. 14 is a block diagram of the entire analysis and synthesis system and the coupling of this system to a communication link.

FIG. 14 is a block diagram of the entire analysis and synthesis system and the coupling of this system to a communication link in which the outputs of the analyzer are communicated to the synthesizer. The analyzer-synthesizer is used as a bandwidth comparison system by extracting the information of importance from the signal source and by reproducing this information at the output of the receiving channel. The signals usually created in practice by various sources, such as music, speech, or visual scenes, contain very much redundant information, and this information requires a much wider bandwidth than is really necessary for the communication of the information actually perceived by an auditor. The analyzer was specifically developed to abstract from audio signals the information really relevant to an auditor, and the synthesizer was specifically developed to recreate the original audio signal, complete so far as the auditor is concerned, from the information produced by the analyzer. The apparatus of FIG. 14 operates nearly identically to that of FIG. 1, with the exceptions noted below. Corresponding elements in the two figures are accordingly labeled in a corresponding way, and reference is made to the discussion for FIG. 1 for the explanation of their operation. There are a few differences, however: The frequency of the variable frequency shift register 14.15, the frequency of the constant frequency shift register 14.21, and the outputs of the selection and conversion circuits 14.5 are applied to a transmitter 14.22.

There are numerous, well-known ways of transmitting a variety of signals. One obvious way is to amplitude or frequency (phase) modulate, with the signals to be transmitted, a variety of different frequency carrier waves. The sum of all such modulated waves is then communicated through a single medium, perhaps by using the sum signal to modulate yet another carrier of higher frequency. Another way is to apply each signal to physically distinct channels, such as wires. Yet another method consists of time sequential multiplexing of the signals to be transmitted into a single signal for transmission over a single wire or other medium. This transmitter may be any one of the types familiar to those skilled in the art, such as a radio transmitter, a telephone transmitter, an optical transmitter, and so forth. The signals produced by the transmitter and communicated through the transmission medium, which may be air or a vacuum for electromagnetic signals, a telephone line, or the like, as the case may be, are reproduced by the receiver 14.23, and are applied to the synthesizer, whose components function just as the corresponding ones of FIG. 1 do with the following exceptions: The constant frequency shift register signal is, however, reproduced by the receiver and applied to the deconversion and distribution circuit 14.9 via line 143. Likewise, the variable frequency shift register signals are reproduced by the receiver and applied to the multiplexer 14.11 via line 141 and the synthesizer digital control logic via line 142. The output of the synthesizer is applied to an output transducer 14.24 suitable for the information communicated.

It should be noted that gates 14.16 and 14.17 may be eliminated, since their primary function is one of impedance buffering. If these gates 14.16 and 14.17 are not used, if the conversion and multiplexing circuits are simply unity transfer function devices for the matrix output signals, if the transmitter and receiver consist of direct connections of corresponding signals, and if the deconversion and distribution devices consist of unity transfer function devices, then the outputs of the analyzer matrix are essentially directly connected to the inputs of the synthesizer matrix, which is the simplest system employing the basic principles. In this case, all the analyzer information is transmitted to the synthesizer in parallel fashion.

In the analyzer-synthesizer constructed the following performance specifications were obtained in the analyzer mode: noise plus drift and offset number of time samples obtained of the input signal per cycle of the ring shift register is equal to 48, permitting the calculation of 23 Fourier amplitudes and phases covering the frequency range from 20 to 18,000 Hz. Linearity of the Fourier amplitudes is better than 0.2 dB over a 60 dB dynamic range of the input signal, and phase linearity is better than 2 percent of full scale (360°). When analyzing a particular partial, the rejection of other harmonically related partials is 46 dB for nearest harmonically related partials and greater than 50 dB for others with a constant (44 %) fractional bandwidth. With a 1 Hz bandwidth, the corresponding figures are 50 dB and 56 dB, respectively. The equivalent input greater is greater than 60 dB below an input sinusoid at 0.5 percent third harmonic distortion. Frequency tracking over a range of 3½ octaves is possible.

The film scanning system is capable of reading 11 Fourier amplitudes and phases on a half 35 mm film frame with an amplitude accuracy of 2 dB (60 dB dynamic range) and a phase accuracy of 4° in 1.5 msec.

The time-sample part of the synthesizer accepts modulation inputs in the range from 0 Hz to 20 kHz to produce an output signal whose frequency may vary from 1 Hz to 48 kHz. Dynamic range from equal signal and noise (RMS basis) to the onset of limiting is 62 dB with distortion less than 1 percent over the full dynamic range.

Figure 8A:
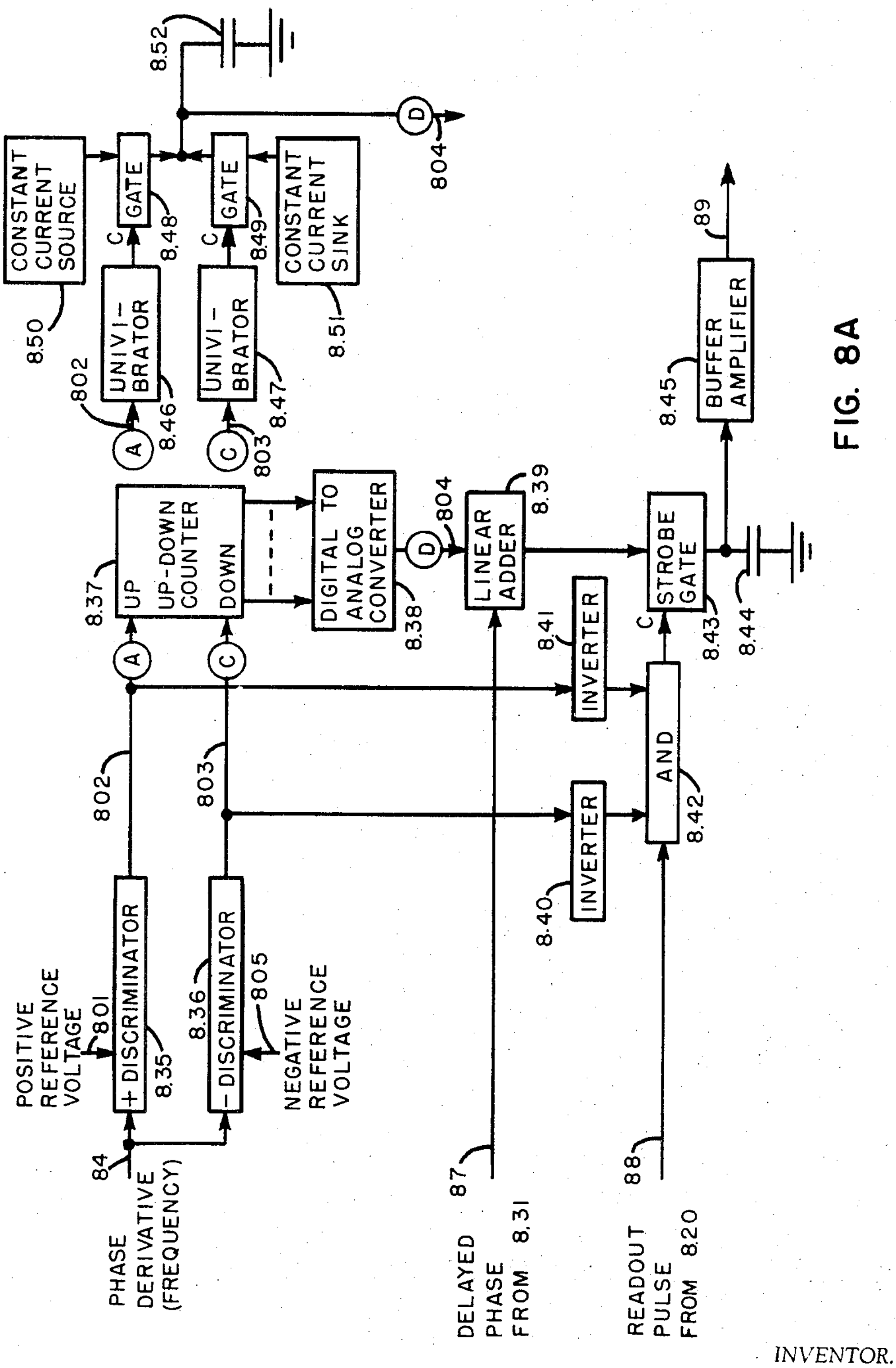
FIG. 8A is a block diagram of the phase-range extender of the analyzer.

FIG. 8A is a block diagram of the phase-range extender of the analyzer. This extender permits the output range of the analyzer, normally restricted to a phase range of $2\pi$ radians (for reasons explained below), to be extended, in principle, to any multiple of this range.

The phase determined by the analyzer is the relative phase of the resultant carrier 86 and the reference flip flop 8.34. This phase is computed by generating a voltage proportional to a time interval (the phase time) that starts with the zero crossing of the reference flip flop 8.34 and that terminates with the zero crossing of the resultant carrier 86. If there is a frequency difference between the analyzer and the signal being analyzed, the value of the phase drifts, say, in a manner corresponding to an increasing time between the aforementioned zero crossings. This time cannot increase indefinitely, however, because the reference flip flop has a definite period corresponding to the time between its adjacent zero crossings. Thus, as the phase time reaches the value equal to the period of the reference flip flop, it returns to the value zero as a new zero crossing of the resultant carrier 86 terminates the phase-time calculation. A drift of this time interval in the opposite direction, that is, from large to small values, results in the value of the phase time jumping from zero, when the zero crossings coincide, to the full period of the reference flip flop. Thus, the voltage proportional to the phase time will jump in value corresponding to the period of the reference flip flop 8.34, which is the time corresponding to $2\pi$ radians of relative phase between the shift register 2.16 in the analyzer and the harmonic of the signal being analyzed. The jump in phase value is called the phase-cut transition.

To accomplish extension of the basic analyzer phase range of $2\pi$ radians, the frequency output 84, which is the derivative of the phase output 81, excites the discriminators 8.35 and 8.36. These discriminators 8.35 and 8.36 sense whether or not the output 84, representing the frequency, exceeds their respective positive and negative reference input voltages 801 and 805. The reference voltages 801 and 805 are chosen so that the discriminators 8.35 and 8.36 provide assertive outputs only when a phase-cut transition occurs on line 81, a condition which produces a pulse of polarity dependent on the direction of the phase-cut transition on line 84, the frequency output.

The outputs of the discriminators 8.35 and 8.36 excite the updown counter 8.37, which accumulates the net number of positive and negative phase-cut transitions, the discriminators 8.35 and 8.36 being connected to the count-up and count-down inputs of the counter 8.37, respectively. The outputs of the counter 8.37 drive a digital-to-analog converter 8.38 which produces a voltage signal proportional to the count stored in the counter 8.37. The up-down counter 8.38 might be an ordinary binary type counter, a shift register with the count-up and count-down signals from the discriminators 8.35 and 8.36 connected to the shift-up and shift-down inputs to the register, respectively, or any other type of discrete counting device(s) capable of counting up and down. The digital-to-analog converter must, of course, be appropriate to the particular type of counting device used.

Alternatively, the up-down counter and digital-to-analog converter may be replaced with circuitry which produces more directly an analog signal proportional to the difference of the number of assertions of the discriminators 8.35 and 8.36. Such circuitry might consist of equal magnitude constant current source 8.50 and sink 8.51, connected to gates 8.48 and 8.49 respectively, which gate a fixed amount of charge into or out of a storage capacitor 8.52, connected in common to the outputs of gates 8.48 and 8.49. Gates 8.48 and 8.49 are controlled by univibrators 8.46 and 8.47 respectively, which have equal periods and are connected to discriminators 8.35 and 8.36 respectively, via lines 802 and 803 respectively. Triggerings of either univibrator 8.46 or 8.47 results in either a fixed charge being added to or taken from the storage capacitor 8.52, respectively. This results in a potential stored on capacitor 8.52 proportional to the difference in the number of positive and negative phase-cut transitions.

Both the up-down counter and the digital-to-analog converter combination or the current gating technique produce output voltages which are scaled so that when added to the delayed phase 87, which is the potential appearing on storage capacitor 8.31, using the linear added 8.39, a jump in value equivalent to a phase change of $2\pi$ in the phase signal 87 during a phase-out transition is cancelled by an equal and opposite change in the output potential of either the digital-to-analog converter or the potential on capacitor 8.52, whichever is connected to the linear adder 8.39 via line 804. The delayed phase 87 is the signal (potential) which appears on storage capacitor 8.31, used to compute the frequency output 84 and which is transmitted to the difference amplifier 8.32. This delayed phase signal is used because one cannot detect that a phase-cut transition has occurred (resulting in a pulse in the frequency output signal 84) until after such a transition has occurred. If the original phase signal 81 were connected to the adder 8.39, addition of the phase-cut correction signal 804 would occur after the transition was completed, giving a pulse in the output of the adder 8.39. However, the delayed phase signal 87 will still not manifest the jump in phase value when the frequency output 84 contains a pulse, indicating a phase-cut transition, and, therefore may be corrected at the time its jump does occur (later) due to a phase-cut transition.

The cancellation of phase-cut jumps in the delayed phase signal 87 by the signal 804 results in a smoothly varying signal at the output of the adder 8.39, to which lines 87 and 804 are connected. It is impossible however, in practice, to provide an exactly timed cancellation signal 804 for the phase signal 87, due to transition times, circuit delays, etc. in the various control circuits such as the discriminators 8.35 and 8.36, up-down counter 8.37, the digital-to-analog converter, etc. This impossibility results in the appearance of residual switching transients in the output of the linear adder 8.39. To eliminate these transients, the output of the adder 8.39 is connected to a strobe gate 8.43 whose output is connected to a storage capacitor 8.44 and a buffer amplifier 8.45. The strobe gate is controlled by the output of an AND gate 8.42, which is in turn excited by the output labeled 88 of the readout univibrator 8.20 and the outputs of inverters 8.40 and 8.41. The inverters 8.40 and 8.41 are driven by the outputs of the discriminators 8.36 and 8.35 respectively, and, using the AND gate 8.42, prevent the activation of the strobe gate 8.43 whenever either discriminator 8.35 or 8.36 senses a phase-cut transition. The readout univibrator 8.20 produces pulses at the rate at which new phase values 87 are generated by the phase circuits. Thus, new values of the extended range phase appearing at the output of the adder amplifier 804 are applied to and stored on the storage capacitor 8.44, except during the period of time that a phase-cut transition is in progress. The gating of the adder 8.39 by the strobe gate 8.43 thus generates a signal identical to the output of the adder 8.39 on the capacitor 8.44, except during the very short interval of switching during a phase-cut transition, providing an extended phase range signal on capacitor 8.44 free of switching transients. The potential stored on the storage capacitor 8.44 is buffered by the high input impedance amplifier 8.45.

The output of the buffer amplifier 8.45 on line 89 is the extended range phase signal and may be used to drive the voltage controlled oscillator 2.22, via the gate 2.28 and the amplifier 2.31, instead of the phase signal 81. For a fixed gain of amplifier 2.31 this provides a much wider range of frequency tracking capability of the analyzer.

The filtering action of the circuitry disclosed in FIG. 13 is useful as a postprocessor for the synthesizer as well as for a preprocessor for the analyzer as described previously. In this case, the postprocessor removes objectionable high frequency components from the output 43 of the synthesizer which result from the process of quantization.

The synthesizer generates complex waveforms through the process of computing a sequence of appropriate voltages, each to be presented as a constant signal for a finite duration of time. This discrete or time-quantized nature of the output of the synthesizer leads to the production of frequency components in the output signal which would not be present if, instead, the continuously varying signal being approximated by the synthesizer were present. These spurious frequency components are generally objectionable and are high frequency components related in a specific way to amplitudes and frequencies of the harmonic components being synthesized. A fixed frequency filter cannot be use, in general, to remove these spurious components because the fundamental frequency, and thereby the frequencies of the spurious components, may vary over a wide range. To remove these spurious components, one needs a low-pass filter whose cutoff frequency is proportional to the frequency of the shift register 4.16, which determines the frequencies of the signals synthesized. The circuits described in FIG. 13 provide appropriate signals to drive the shift register 4.16 and also to filter the output of the synthesizer.

To accomplish this filtering, the output 43 of the synthesizer is considered to be the signal source 13.1, the voltage-controlled oscillator 4.13 considered synonymous with the voltage-controlled oscillator 13.2 and its divider flip flops 13.23, (with the output of oscillator 4.13 being synonymous with the output of the divider flip flop(s) 13.23) and the coupled switches 13.21 and 13.20 are in a position opposite from that shown. In this case, the output of the amplifier 13.15 will be a low-pass filtered version of the output 43 of the synthesizer, where the cutoff frequency is proportional to the shift register 4.16 ring frequency, which is indeed the synthesizer fundamental frequency.

By appropriate choice of the width of the univibrator 13.24 pulse and the values of the resistors 13.6, 13.10, 13.13, and the capacitors 13.7, 13.11, and 13.14, one can determine the appropriate multiple of the fundamental frequency for the cutoff frequency of the filter being used as a synthesizer postprocessor. In the pre nt invention, these values were chosen to provide a cutoff frequency equal to 18 times the fundamental frequency.

The specific embodiments described herein are by way of example for illustrating the best mode now contemplated for practicing the invention. It is evident that those skilled in the art may now make numerous modifications and uses of and departures from the specific embodiments disclosed herein without departing from the inventive concepts. Consequently, the invention is to be construed as limited solely by the spirit and scope of the appended claims.

We claim:

1. Signal processing apparatus comprising,
   means for receiving a signal to be analyzed having values as a function of time,
   a plurality of storage means for storing respective time-spaced values of the signal to be analyzed,
   means for sequentially coupling respective ones of said storage means to said means for receiving to store said time-spaced values,
   transformation matrix means having output means and a number of inputs corresponding to said plurality for converting each of said time-spaced values in a predetermined manner to an output signal on said output means characteristic of the signal to be analyzed,
   and means for coupling each of said storage means to a respective one of said transformation matrix inputs.

2. Signal processing apparatus in accordance with claim 1 wherein said transformation matrix means includes means responsive to said time-spaced values for providing said output signal with values representative of respective coefficients of basis signal components of the signal to be analyzed.

3. Signal processing apparatus in accordance with claim 2 and further comprising,
   a plurality of synthesizer storage means for storing respective ones of said output signal values,
   synthesizer transformation matrix means having output means and a number of inputs corresponding to said plurality of synthesizer storage means for converting each of said stored output signal values in a predetermined manner to an output signal on said last-mentioned output means characterized by said stored output signal values,
   and means for coupling each of said synthesizer storage means to a respective one of said synthesizer transformation matrix means inputs.

4. Signal processing apparatus in accordance with claim 3 and further comprising output processing means coupled to said last-mentioned output means for providing a synthesized output signal that is a continuous function of time having a waveform characterized by said stored output signal values.

5. Signal processing apparatus in accordance with claim 1 wherein each of said storage means is a capacitor,
   said means for sequentially coupling comprises a number of distribution gates corresponding to said plurality with the inputs of each of said distribution gates coupled to said means for receiving and the output of each distribution gate coupled to a respective capacitor,
   a source of a variable frequency control signal,
   and analyzer control logic means responsive to said variable frequency control signal for providing distribution gating signals to said distribution gates for sequentially closing the latter distribution gates during mutually exclusive time intervals.

6. Signal processing apparatus in accordance with claim 5 wherein said means for coupling each of said storage means to a respective one of said transformation matrix inputs comprises a number of transformation gates corresponding to said plurality with each transformation gate coupling a respective one of said capacitors to a respective transformation matrix input means,
   said analyzer control logic means being responsive to said variable frequency control signal for providing transformation gating signals to said transformation gates for closing said transformation gates during selected time intervals that are much shorter than the time interval in which said transformation gates are open.

7. Signal processing apparatus in accordance with claim 1 wherein said transformation matrix means includes means responsive to said time-spaced values for providing said output signal with values representative of respective coefficients of basis signal components of the signal to be analyzed and each of said storage means is a capacitor and further comprising,
   a transformation matrix output gate for each of said output values,
   a source of a variable frequency control signal, and analyzer control logic means responsive to said variable frequency control signal for providing transformation matrix output gating signals to said transformation matrix output gates for closing said transformation matrix output gates during selected time intervals that are much shorter than the time interval in which the latter gates are open.

8. Signal processing apparatus in accordance with claim 7 wherein said means for sequentially coupling comprises a number of distribution gates corresponding to said plurality with the inputs of each of said distribution gates coupled to said means for receiving and the output of each distribution gate coupled to a respective capacitor, said source of a variable frequency control signal, and said analyzer control logic means responsive to said variable frequency control signal for providing distribution gating signals to said distribution gates for sequentially closing the latter distribution gates during mutually exclusive time intervals.

9. Signal processing apparatus in accordance with claim 8 wherein said means for coupling each of said storage means to a respective one of said transformation matrix inputs comprises a number of transformation gates corresponding to said plurality with each transformation gate coupling a respective one of said capacitors to a respective transformation matrix input means, said analyzer control logic means being responsive to said variable frequency control signal for providing transformation gating signals to said transformation gates for closing said transformation gates during selected time intervals that are much shorter than the time interval in which said transformation gates are open.

10. Signal processing apparatus in accordance with claim 1 wherein said transformation matrix means comprises a first matrix with a first half of said inputs and a second matrix with a second half of said inputs and said means for coupling each of said storage means comprises means for coupling alternate ones of said storage means to a respective one of said first matrix inputs and means for coupling the remaining ones of said storage means to said second matrix inputs whereby interleaved time samples are delivered to said first and second matrices, and switching means for changing the signs of signals transmitted by said first matrix relative to the signs of the signals transmitted by said second matrix.

11. Signal processing apparatus in accordance with claim 10 wherein said switching means is a foldover switch.

12. Signal processing apparatus in accordance with claim 1 wherein said transformation matrix means includes means responsive to said time-spaced values for providing said output signal with values representative of respective coefficients of basis signal components of the signal to be analyzed and further comprising a source of a carrier signal, and means responsive to said carrier signal and said output signal with values representative of respective coefficients of basis signal components of the signal being analyzed for providing an output phase signal representative of the difference in time between zero crossings of said carrier signal and zero crossings of a spectral components related to said output signal.

13. Signal processing apparatus in accordance with claim 1 wherein said transformation matrix means includes means responsive to said time-spaced values for providing said output signal with values representative of respective coefficients of basis signal components of the signal to be analyzed and further comprising, a source of first and second carrier signals of fixed frequency in time quadrature, first modulating means for modulating said first carrier signal with said output signal having values representative of representative coefficients of basis signal components of the signal to be analyzed to provide a first modulated output signal, second modulating means for modulating said second carrier signal with said output signal having values to provide a second modulated output signal, means for combining said first and second modulated output signals to provide a summed modulated signal, a bandpass filter energized by said summed modulated signal for transmitting a predetermined band of spectral components about said fixed frequency to provide a resultant carrier signal, means responsive to each zero crossing of said resultant carrier signal for providing a strobe pulse, an amplitude storage means, means including a strobe gate coupling said resultant carrier signal to said amplitude storage means, and means for coupling the latter strobe pulses to said strobe gate for opening said strobe gate for a short time interval embracing each peak of said resultant carrier signal.

14. Signal processing apparatus in accordance with claim 1 wherein said transformation matrix means includes means responsive to said time-spaced values for providing said output signal with values representative of respective coefficients of basis signal components of the signal to be analyzed and further comprising, a source of a reference signal, detecting means responsive to said output signal having values for providing a phase signal representative of the phase of a spectral component of the signal to be analyzed relative to that of said reference signal, and means responsive to said phase signal and said reference signal for providing a phase cut signal representative of a small phase range embracing said phase of a spectral component, said small phase range being much less than 360°.

15. Signal processing apparatus in accordance with claim 14 wherein said means responsive comprises, an AND gate energized by said phase signal and said reference signal one inverted with respect to the other to provide a trigger pulse when the latter two signals partially overlap, a phase cut overlap univibrator responsive to the latter trigger pulse for then providing an overlap pulse of predetermined duration, an OR gate energized by said phase signal and said reference signal one inverted with respect to the other and said overlap pulse inverted for providing a set pulse, a source of a static OFF signal, a shift register having at least first and second elements, a serial input energized by said static OFF signal, a shift input for receiving shift pulses, and a set input associated with said first element for receiving said set pulse to set said first element, and an information shift delay univibrator responsive to said phase signal for providing shift pulses of predetermined duration that are coupled to said shift input for shifting said shift register.

16. Signal processing apparatus in accordance with claim 1 wherein said transformation matrix means includes means responsive to said time-spaced values for providing said output signal with values representative of respective coefficients of basis signal components of the signal to be analyzed and further comprising, detecting means responsive to said output signal having values for providing a frequency signal representative of the frequency of a spectral component of the signal to be analyzed, a source of a center frequency signal, and means responsive to said frequency signal and said center frequency signal for providing a coherence signal when the magnitude of said frequency signal is less than a predetermined time duration.

17. Signal processing apparatus in accordance with claim 16 wherein said means responsive to said frequency signal and said center frequency signal comprises, a runup capacitor, means responsive to said center frequency signal for charging said runup capacitor to a predetermined completion potential when said magnitude is less than said predetermined value for said predetermined time, means responsive to each attainment of said completion potential for providing a coherent pulse and returning said capacitor to a predetermined initial potential, and means responsive to said magnitude being more than said predetermined value for said predetermined time during returning said runup capacitor to said predetermined initial potential before said completion potential is attained.

18. Signal processing apparatus in accordance with claim 17 and further comprising, first and second voltage controlled univibrators responsive to alternate ones of said coherent pulses respectively for providing time overlapping output pulses of duration controlled by said center frequency signal, and an OR gate energized by said overlapping pulses for providing a coherent control signal for the duration of coherence.

19. Signal processing apparatus in accordance with claim 1 wherein said means for coupling includes frequency selective apparatus having an input, an output, at least one energy storage element between said input and said output, gating means coupled to said energy storage element, a source of a variable duty cycle gating signal, and means for coupling said variable duty cycle gating signal to said gating means whereby the frequency response characteristic between said input and said output of said frequency selective apparatus is related to the ratio of closed to open time of said gating means.

20. Signal processing apparatus in accordance with claim 19 wherein said energy storage element is a shunt capacitor and said gating means is in series between said input and said output.

21. Signal processing apparatus in accordance with claim 19 wherein said energy storage element is in series between said input and said output and said gating means is a shunt gate.

22. Signal processing apparatus in accordance with claim 1 wherein said transformation matrix means includes means responsive to said time-spaced values for providing said output signal with values representative of respective coefficients of basis signal components of the signal to be analyzed and further comprising a period divider for dividing a time interval on the basis of the duration of a previous time interval, said period divider comprising, a source of a previous ramp signal that commenced at the beginning of said previous time interval, a source of a present ramp signal that changes at a rate greater than that of said previous ramp signal whereby said present and previous ramp signals reach equality in said present time interval, and means for comparing said previous ramp signal with said present ramp signal to provide a dividing pulse upon said equality to identify a division of said present interval.

23. Signal processing apparatus in accordance with claim 1 wherein said means for coupling includes frequency selective apparatus having an input, an output, at least one energy storage element between said input and said output, gating means coupled to said energy storage element, a source of a variable duty cycle gating signal, and means for coupling said variable duty cycle gating signal to said gating means whereby the frequency response characteristic between said input and said output of said frequency selective apparatus is related to the ratio of closed to open time of said gating means and said source of a variable duty cycle gating signal comprises, a source of a bandwidth control signal, a source of a variable frequency signal, and means responsive to said variable frequency signal and said bandwidth control signal for providing said variable duty cycle signal as a train of pulses of frequency determined by said variable frequency signal and of duration determined by said bandwidth control signal.

24. Signal processing apparatus in accordance with claim 1 wherein said transformation matrix means includes means responsive to said time-spaced values for providing said output signal with values representative of respective coefficients of basis signal components of the signal to be analyzed and further comprising, detecting means responsive to said output signal having values for providing a phase signal representative of the phase of a spectral component of the signal to be analyzed, a source of a reference signal, and means for differentiating said phase signal to provide a phase difference that is representative of the difference in frequency between said spectral component and said reference signal.

25. Signal processing apparatus in accordance with claim 24 wherein said means for differentiating said phase signal comprises a first storage capacitor for storing a first potential representative of a first time interval between a first and second zero crossings of said phase signal, a second storage capacitor for storing a second potential representative of a second time interval between phase signal zero crossings different from said first time interval, means for successively transferring the potential on said first storage capacitor to said second storage capacitor and then providing said first storage capacitor with a new first potential representative of a new first time interval, and means for differentially combining the signals on said first and second storage capacitors to provide a frequency signal representative of said difference in frequency.

26. Signal processing apparatus in accordance with claim 1 wherein said transformation matrix means includes means responsive to said time-spaced values for providing said output signal with values representative of respective coefficients of basis signal components of the signal to be analyzed and further comprising, a source of a carrier signal, means responsive to said carrier signal and said output signal with values representative of respective coefficients of basis signal components of the signal being analyzed for providing an output phase signal representative of the difference in time between zero crossings of said carrier signal and zero crossings of a spectral component related to said output signal, and a voltage controlled oscillator responsive to said output phase signal for providing a frequency tracking signal.

27. Signal processing apparatus in accordance with claim 26 and further comprising, detecting means responsive to said output signal having values for providing a frequency signal representative of the frequency of a spectral component of the signal to be analyzed, a source of a center frequency signal, means responsive to said frequency signal and said center frequency signal for providing a coherence signal when the magnitude of said frequency signal is less than a predetermined value for a predetermined duration, said voltage controlled oscillator providing a frequency tracking signal in response to both said output phase signal and said coherence signal.

28. Signal processing apparatus in accordance with claim 1 wherein said transformation matrix means comprises a first matrix with a first half of said inputs and a second matrix with a second half of said inputs and said means for coupling each of said storage means comprises means for coupling alternate ones of said storage means to a respective one of said first matrix inputs and means for coupling the remaining ones of said storage means to said second matrix inputs whereby interleaved time samples are delivered to said first and second matrices, switching means for changing the signs of signals transmitted by said first matrix relative to the signs of the signals transmitted by said second matrix and said means for coupling each of said storage means comprises, a period divider comprising means for providing alternate time samples to said first and second matrix means.

29. Signal processing apparatus in accordance with claim 1 wherein said transformation matrix means includes means responsive to said time-spaced values for providing said output signal with values representative of respective coefficients of basis signal components of the signal to be analyzed and further comprising, means for heterodyning the input signal to be analyzed up in frequency to provide a translated input signal with spectral components centered about a predetermined center frequency, and signal sideband filtering means responsive to said translated input signal for transmitting only those of the latter spectral components on one side of said predetermined center frequency.

30. Signal processing apparatus in accordance with claim 1 wherein said transformation matrix means includes means responsive to said time-spaced values for providing said output signal with values representative of respective coefficients of basis signal components of the signal to be analyzed and further comprising, means for attenuating high frequency components of the input signal to be analyzed that would otherwise be folded back into the frequency range of said signal processing apparatus by the sequential coupling process.

31. Signal processing apparatus in accordance with claim 1 wherein said means for coupling includes frequency selective apparatus having an input, an output, at least one energy storage element between said input and said output, gating means coupled to said energy storage element, a source of a variable duty cycle gating signal, and means for coupling said variable duty cycle gating signal to said gating means whereby the frequency response characteristic between said input and said output of said frequency selective apparatus is related to the ratio of closed to open time of said gating means and, detecting means responsive to said output signal having values for providing a phase signal representative of the phase of a spectral component of the signal to be analyzed, a source of a reference signal, means responsive to said reference signal and said phase signal for determining the difference between successive samples of said phase signal to provide a phase difference signal that is representative of the difference in frequency between said spectral component and said reference signal, and means responsive to said phase difference signal for controlling said variable duty cycle signal.

32. Signal processing apparatus in accordance with claim 1 wherein said transformation matrix means includes means responsive to said time-spaced values for providing said output signal with values representative of respective coefficients of basis signal components of the signal to be analyzed and said transformation matrix means is at a location different from said synthesizer storage means and said synthesizer transformation matrix means and further comprising, a communication link means for coupling said output signal with values representative of respective coefficients of basis signal components of the signal then being analyzed to said plurality of synthesizer storage means, a plurality of synthesizer storage means for storing respective ones of said output signal values, synthesizer transformation matrix means having output means and a number of inputs corresponding to said plurality of synthesizer storage means for converting each of said stored output signal values in a predetermined manner to an output signal on said last-mentioned output means characterized by said stored output signal values, means for coupling each of said synthesizer storage means to a respective one of said synthesizer transformation matrix means inputs, and output processing means coupled to said last-mentioned output means for providing a synthesized output signal that is a continuous function of time having a waveform characterized by said stored output signal values.

33. Signal processing apparatus comprising, a plurality of synthesizer input terminals for receiving a corresponding plurality of input signals, a corresponding plurality of synthesizer storage means for storing respective ones of said input signals received on said input terminals, synthesizer transformation matrix means having output means with a number of output terminals and a number of transformation inputs corresponding to said plurality for converting each of said stored signals in a predetermined manner to provide an output signal on said last-mentioned output means characterized by the stored input signals, a signal output terminal, means for sequentially coupling the transformation matrix output terminals to said signal output terminal to provide an output signal having values as a function of time, and means for coupling each of said synthesizer storage means to a respective one of said transformation inputs.

34. Signal processing apparatus in accordance with claim 33 and further comprising detecting means with an axis crossing detector for providing said input signals comprising, a source of a moving light spot, a photodetector arranged to selectively receive light from said spot and provide a corresponding transduced output signal to a respective one of said input terminals, derivativing means responsive to said transduced output signal for providing a derivative signal corresponding to the derivative of said transduced output signal, and a zero crossing detector responsive to said derivative signal for providing a crossing output signal when said derivative signal passes through zero.

35. Signal processing apparatus in accordance with claim 33 and including deconversion circuit means for converting a time interval into the amplitude of a trigonometric function comprising, a resonant circuit having inductance and capacitance, means for applying a signal to said resonant circuit for the duration of a respective input signal to provide a signal whose value is proportional to a trigonometric function of said respective input signal and said resonant circuit.

36. Signal processing apparatus in accordance with claim 35 and further comprising, current draining means, gating means coupling said tank circuit to said current draining means to provide a product signal that is the product of said signal whose value is proportional to a trigonometric function with a second time interval proportional to the time said gating means is on.

37. Signal processing apparatus in accordance with claim 36 wherein said current draining means is a substantially constant current device having a resistor connected to a source of constant potential.

38. Signal processing apparatus detecting means with an axis crossing detector comprising, a source of a moving light spot, a photodetector arranged to selectively receive light from said spot and provide a corresponding transduced output signal to a respective one of said input terminals, derivativing means responsive to said transduced output signal for providing a derivative signal corresponding to the derivative of said transduced output signal, and a zero crossing detector responsive to said derivative signal for providing a crossing output signal when said derivative signal passes through zero.

39. Signal processing apparatus in accordance with claim 33 and wherein said means for sequentially coupling comprises, multiplexing means including, a plurality of first stage gates each having an output, a second stage noise elimination gate, and means for coupling the outputs of said first stage gates in common to the input of said second stage noise elimination gate.

40. Signal processing apparatus in accordance with claim 33 and further comprising, partial control generator means coupled to said input terminals for providing a signal representative of predetermined partials.

41. Signal processing apparatus in accordance with claim 40 wherein said partial control generating means comprises, a flying spot scanning system including a photodetector and a photograph on film.

42. Signal processing apparatus in accordance with claim 40 and further comprising deconversion circuit means energized by said partial control generating means.

43. Signal processing apparatus in accordance with claim 42 and further comprising, analog storage condensers and distribution circuit means coupled to the output of said deconversion circuit means.

44. Signal processing apparatus in accordance with claim 1 wherein each of said storage means comprises storage capacitor means for storing substantially simultaneously samples of an input signal and its negative and said means for sequentially coupling comprises, a shift register, a plurality of gate means driven by said shift register for sequentially enabling said gate means, and means for coupling each of said storage capacitor means to only a respective one of said gate means.

45. Signal processing apparatus in accordance with claim 1 wherein said transformation matrix consists of passive elements.

46. Signal processing apparatus in accordance with claim 45 wherein said passive elements comprise resistors, condensors and inductors.

47. Signal processing apparatus in accordance with claim 1 wherein said transformation matrix comprises controllable elements and further comprising means for externally controlling said passive elements.

48. Signal processing apparatus in accordance with claim 1 wherein said transformation matrix consists of active elements.

49. Signal processing apparatus in accordance with claim 12 wherein said means responsive to said carrier signal and said output signal with values comprises, a source of a second carrier signal of the same frequency as said first-mentioned carrier signal in phase quadrature therewith, first and second modulating means for modulating said output signal with values with said first-mentioned and said second carrier signals, respectively, summing means for providing a resultant carrier signal that is the sum of the spectral components around said carrier signal frequency provided by said first and second modulating means, means responsive to said resultant carrier signal for providing a zero crossing signal representative of the time intervals between zero crossings of said resultant carrier signal and corresponding crossings of either modulating carrier signal.

50. Signal processing apparatus comprising, a first set of terminals, another terminal, transformation matrix means having an input and an output for establishing a predetermined relationship between a set of signals on said first set of terminals and a signal on said another terminal, means for coupling said first set of terminals to one of the input and output of said transformation matrix means, and means for coupling said another terminal to the other of the input and output of said transformation matrix means.

51. Signal processing apparatus in accordance with claim 50 and further comprising, storage means having a plurality of storage elements for storing signals each coupled to a respective one of the terminals of said first set, said transformation matrix means comprising means for effecting a transformation between the signals stored in said storage elements and a signal on said another terminal.

52. Signal processing apparatus comprising, transformation matrix means have a first plurality at least three of terminals and a second plurality at least three of terminals, each of said first plurality of terminals associated with means for handling signal spectral components within a predetermined bandwidth, multiplexer means for sequentially coupling said second plurality of terminals to a common terminal at a predetermined repetition frequency and characterized by a transmission bandwidth at least equal to the sum of said predetermined bandwidths with the low end of said transmission bandwidth corresponding to said repetition frequency, said transformation matrix means coacting with the remainder of said apparatus to comprise means for providing any function of time having spectral components within said transmission bandwidth when each signal on said first plurality of terminals has spectral components within a bandwidth considerably less than said transmission bandwidth.

53. Signal processing apparatus in accordance with claim 50 and further comprising, storage means having a plurality of storage elements for storing signals each coupled to a respective one of the terminals of said first set, said transformation matrix means comprising means for effecting a transformation between the signals stored in said storage elements and a signal on said another terminal, and means for scanning each of said storage elements in sequence.

* * * * *